(12) United States Patent
Volos et al.

(10) Patent No.: US 10,797,981 B2
(45) Date of Patent: Oct. 6, 2020

(54) APPLICATION SPECIFIC CONNECTED SERVICE PROVISION SYSTEM

(71) Applicants: DENSO International America, Inc., Southfield, MI (US); DENSO CORPORATION, Kariya, Aichi-pref. (JP)

(72) Inventors: Haris Volos, Sunnyvale, CA (US); Takashi Bando, Mountain View, CA (US); Kenji Konishi, San Jose, CA (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/255,507

(22) Filed: Jan. 23, 2019

(65) Prior Publication Data

US 2019/0280954 A1    Sep. 12, 2019

Related U.S. Application Data

(60) Provisional application No. 62/640,089, filed on Mar. 8, 2018.

(51) Int. Cl.
| | | |
|---|---|---|
| *H04L 12/26* | (2006.01) | |
| *G06N 7/00* | (2006.01) | |
| *H04W 4/40* | (2018.01) | |

(52) U.S. Cl.
CPC ......... *H04L 43/0852* (2013.01); *G06N 7/005* (2013.01); *H04W 4/40* (2018.02)

(58) Field of Classification Search
CPC .............................. H04L 43/0852; H04W 4/40
See application file for complete search history.

(56) References Cited

U.S. PATENT DOCUMENTS

| | | |
|---|---|---|
| 8,612,599 B2 | 12/2013 | Tung et al. |
| 8,930,979 B2 | 1/2015 | Tidwell et al. |
| (Continued) | | |

OTHER PUBLICATIONS

U.S. Appl. No. 15/882,420, filed Jan. 29, 2018, Volos et al.

(Continued)

*Primary Examiner* — Jamaal Henson
(74) *Attorney, Agent, or Firm* — Harness, Dickey & Pierce, P.L.C.

(57) ABSTRACT

A vehicle application enabling system is provided and includes a memory and initialization, latency evaluation, and application enable modules. The initialization module: receives a maximum network latency; sets a percentage of occurrences that the maximum network latency is not satisfied, a maximum false positive rate, and a maximum deviation value; and calculates a weighting factor based on the percentage of occurrences, maximum false positive rate and maximum deviation value. The latency evaluation module implements a latency evaluation algorithm, which includes: comparing one or more latency estimates to the maximum network latency to provide one or more samples; updating confusion matrix statistics based on the one or more samples; updating a probability threshold based on the maximum false positive rate; updating weighted observations based on the weighting factor; and determining a predicted decision based on the probability threshold. The application enable module executes the vehicle application based on the probability threshold.

20 Claims, 18 Drawing Sheets

(56) References Cited

U.S. PATENT DOCUMENTS

| | | | |
|---|---|---|---|
| 10,026,240 B2* | 7/2018 | Ezawa | B61K 9/00 |
| 10,292,136 B2* | 5/2019 | Rubin | G08G 1/096791 |
| 2018/0257660 A1* | 9/2018 | Ibrahim | G08G 1/163 |
| 2019/0102689 A1* | 4/2019 | Lassoued | G07C 5/0841 |
| 2020/0007342 A1* | 1/2020 | Liem | H04L 9/3239 |

OTHER PUBLICATIONS

U.S. Appl. No. 15/882,489, filed Jan. 29, 2018, Volos et al.
U.S. Appl. No. 15/882,420, filed Jan. 29, 2018, H. Volos.
U.S. Appl. No. 15/882,489, filed Jan. 29, 2018, H. Volos.

* cited by examiner

APPLICATION SPECIFIC CONNECTED SERVICE PROVISION SYSTEM

CROSS-REFERENCE TO RELATED APPLICATIONS

This application claims the benefit of U.S. Provisional Application No. 62/640,089, filed on Mar. 8, 2018. The entire disclosure of the application referenced above is incorporated herein by reference.

FIELD

The present disclosure relates to in-vehicle implemented applications and latency of corresponding signals.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Modern vehicles implement various software applications (hereinafter referred to as "applications"). Some example applications are a lane change application, a collision avoidance application, a ramp routing application, and a platooning application. A lane change application may be executed to assist a driver of a vehicle and/or control vehicle operation during a lane change event, which includes moving a vehicle from a first lane of traffic to a second lane of traffic. A collision avoidance application may be executed to prevent a collision with a pedestrian, a vehicle and/or other object. A collision avoidance application may detect conditions of an environment and perform countermeasures to prevent a collision. This may include, for example, generating warning signals, assisting a driver of a vehicle in performing certain tasks (e.g., braking), and/or controlling operation of the vehicle.

A ramp routing application is similar to a lane change application and may be executed to assist a driver of a vehicle and/or control vehicle operation when moving a vehicle from a lane of traffic to an entrance ramp or an exit ramp. A platooning application may be executed to assist a driver of a vehicle during a platooning event. A platooning event refers to when one or more "follow" vehicles are controlled to closely follow one or more "lead" vehicles. A follow vehicle may also be a lead vehicle. Each follow vehicle may draft a lead vehicle. This is done to reduce drag on the follow vehicle for improved fuel efficiency and to reduce vehicle congestion within a given geographical area. Platooning that is implemented in a first geographical area can reduce congestion in other nearby geographical areas.

SUMMARY

A vehicle application enabling system is provided and includes a memory, an initialization module, a latency evaluation module and an application enable module. The memory is configured to store a maximum network latency for a vehicle application. The initialization module is configured to: receive the maximum network latency from the memory; set a percentage of occurrences that the maximum network latency is not satisfied, a maximum false positive rate, and a maximum deviation value; and calculate a weighting factor based on the percentage of occurrences that the maximum network latency is not satisfied, the maximum false positive rate and the maximum deviation value. The latency evaluation module is configured to implement a latency evaluation algorithm. The latency evaluation algorithm includes: comparing one or more latency estimates to the maximum network latency to provide one or more samples; updating confusion matrix statistics based on the one or more samples; updating a probability threshold based on the maximum false positive rate; updating weighted observations based on the weighting factor; and determining a predicted decision based on the probability threshold. The application enable module is configured to execute the vehicle application based on the probability threshold.

A method of operating a vehicle application enabling system is provided and includes: storing a maximum network latency for a vehicle application; receiving the maximum network latency from the memory; setting a percentage of occurrences that the maximum network latency is not satisfied, a maximum false positive rate, and a maximum deviation value; and calculating a weighting factor based on the percentage of occurrences that the maximum network latency is not satisfied, the maximum false positive rate and the maximum deviation value. The method further includes implementing a latency evaluation algorithm including: comparing one or more latency estimates to the maximum network latency to provide one or more samples; updating confusion matrix statistics based on the one or more samples; updating a probability threshold based on the maximum false positive rate; updating weighted observations based on the weighting factor; and determining a predicted decision based on the probability threshold. The method further includes executing the vehicle application based on the probability threshold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
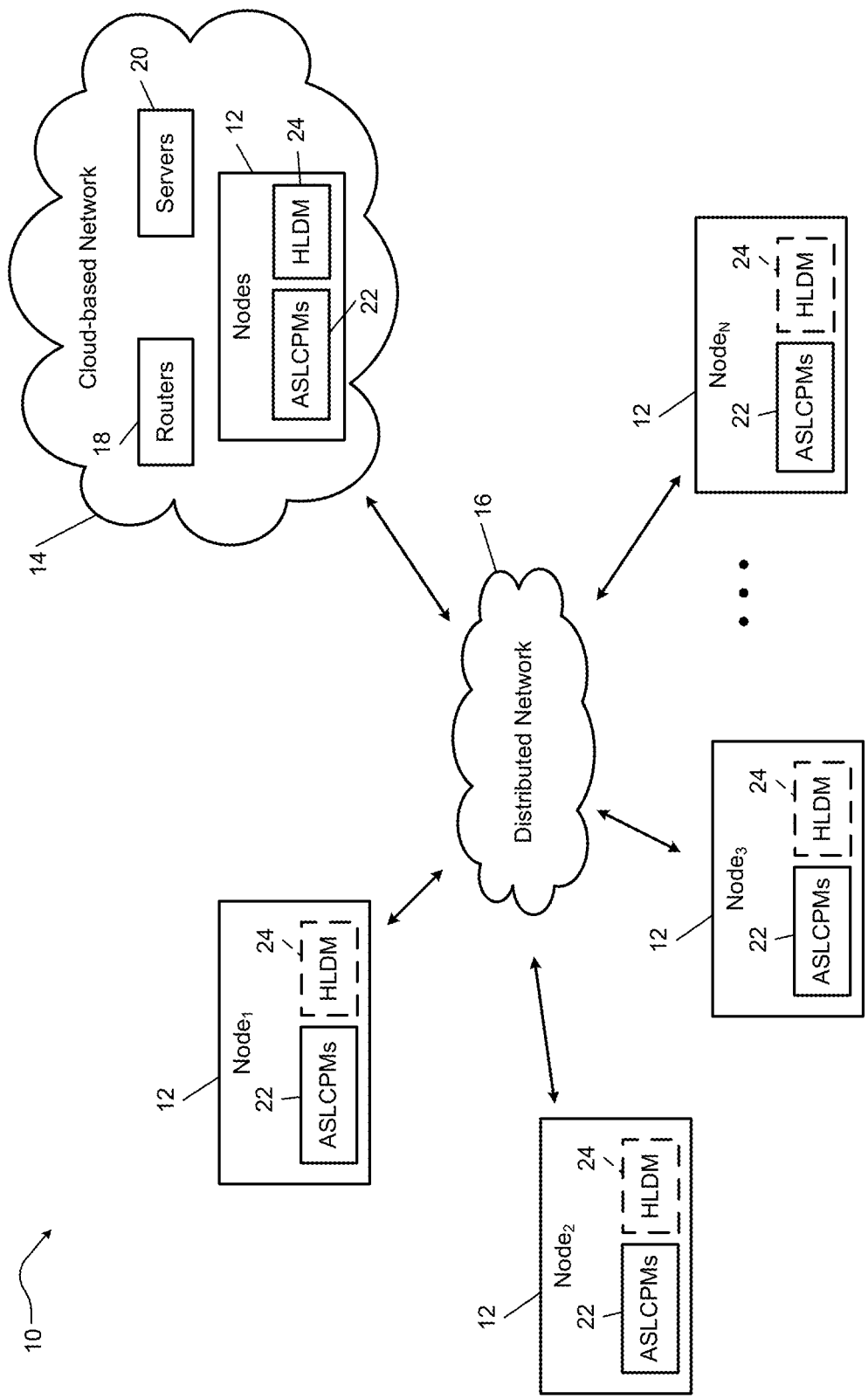
FIG. 1 is a functional block diagram of an example of a latency based vehicle operating system including nodes each having application specific latency characterization and prediction modules (ASLCPMs) and/or a historical latency data module (HLDM) in accordance with an embodiment of the present disclosure.

The various applications implemented in vehicles often include the reception and/or transmission of signals, for example, between vehicles, between vehicles and road side devices (or road side units), between road side devices, between vehicles and devices in a cloud-based network, and/or between other network devices. There are latencies associated with propagation of the signals and processing and queueing of data associated with the signals. Depending on the durations of these latencies, some of the data transferred may be outdated and as a result unusable. This can limit and/or prevent use of an application.

Modeling latency is challenging because of the large amount of associated data and the dynamically and continuously changing vehicle operating environments. The examples set forth herein include modeling latency and making decisions whether to run applications based on estimated confidence interval values and probability estimates of latency. Specific latency models and recent and historical latency observations may be used to calculate probabilities that estimated latencies meet requirements for executing certain applications with a predefined confidence level. Vehicle applications that have latencies satisfying latency requirements are enabled. The examples disclosed herein are applicable to lane change applications, collision avoidance applications, ramp routing applications, platooning applications and/or other in-vehicle implemented applications.

Many mobile applications are cloud based. A mobile device communicates through an Internet connection directly to a cloud based data center for storing, retrieving, and processing data. A cloud based architecture can be speed inadequate when a data volume to be processed is high, such as in video and light detection and ranging (LiDAR) implementations and/or when latency requirements are low (e.g., tens of milliseconds). To this end, cloud based resources (referred to as Layer 3) associated with processing and storing data may be brought closer to an end user device by providing a smaller (or less complex) version of the cloud based resources at an access point (referred to as Layer 2). The access point is closer to the end user device (referred to as Layer 1).

Edge or fog computing applications may be used instead of cloud based applications. The terms "fog" and "edge" are interchangeable. The term "edge" may refer to a first or closest wireless communication node that is connected to a UE executing an application. The wireless communication node may be, for example, a wireless fidelity (Wi-Fi) access point, a cellular tower, or a roadside unit. Vehicle crashes are a concern, especially those occurring in intersections and intersection-related crashes, which share 44.9% of all injury crashes and 39.7% of all crashes. In part for increasing safety in intersections, vehicles are becoming connected via vehicle-to-vehicle (V2V) and vehicle-to-infrastructure (V2I) connections. The stated connections allow for the exchange of information between vehicles to provide fully automated and coordinated driving.

Low signal latency and response time requirements exist for safety applications, such as applications providing pedestrian crossing warnings, red light changing warnings, highway entrance assistance warnings, platooning, sudden braking notifications, etc. The United States Department of Transportation has a connected vehicle pilot deployment program that tests tens of applications, including at least 13 safety applications. Each application has respective latency requirements. How latency requirements relate to the dedicated short range communications (DSRC) standard proposed for V2X and other two-way communication technologies are currently being considered and studied.

Mobile edge computing (MEC) is expected to decrease communication latency. Vehicular safety applications have strict latency requirements. Despite the decreases in latency times when implementing MEC, latency times vary based on traffic load and signal conditions. The examples disclosed herein include determining whether current conditions of an environment are associated with satisfying latency requirements for a particular application. If the latency requirements are able to be satisfied, then the application is permitted to be executed.

FIG. 1 shows an example of a latency based vehicle operating system 10 that operates as a distributed edge computing system, which may span a geographical area (e.g., an office, a building, a neighborhood city, multiple cities, one or more states, and/or one or more countries). The latency based vehicle operating system 10 provides a distributed architecture, which may be implemented in a distributed environment similar to that shown in FIG. 2. The latency based vehicle operating system 10 includes nodes 12 and a cloud-based network (or "the cloud") 14. One or more of the nodes may be located in the cloud-based network. As an example, the nodes 12 may communicate with each other directly or via a distributed network 16. The distributed network may include the Internet, switches, routers, base stations, gateways, satellites, intermediary communication devices. The cloud-based network 14 may include some of the nodes 12, routers, 18, servers 20 and/or other network devices. Although shown separately, the nodes 12 of the cloud-based network 14 may be implemented as or in one or more of the servers 20. Each of the nodes 12 may include application specific latency characterization and prediction modules (ASLCPMs) 22 and/or a HLDM 24. The ASLCPMs 22 perform latency characterization and provide latency models and projections for signals transmitted between the nodes. The one or more HLDMs 24 characterize historical latency data and provide latency models and projections including distance based latency estimates.

In one embodiment, one of the nodes includes a HLDM and the other nodes do not include an HLDM. In another embodiment, one of the servers 20 and/or nodes 12 of the cloud-based network 14 includes a full-scale version of a HLDM and the other nodes include a partial-scale version of a HLDM. For example, a full-scale version of a HLDM may store all historical latency data for the latency based vehicle operating system 10 and process the historical latency data to provide latency distributions and projections based on the historical latency data stored in the cloud-based network. The partial-scale versions of a HLDM of the other nodes may store a portion of the historical latency data and/or perform a limited amount of calculations and/or a limited amount of processing of the corresponding portions of the historical latency data.

Each of the nodes outside of the cloud-based network 14 may be a vehicle, a road side device (RSD), or other network device. A RSD may be located at a signal light, on a building, on a pole near a road, or on some other structure. A RSD may (i) monitor an environment in a local area of the RSD, (ii) monitor latencies of signals transmitted to and/or from the RSD, and/or (iii) share with other nodes information indicative of a state of the environment, the latencies, and/or other related information, as further described below.

By having ASLCPMs at each of the nodes, a network of ASLCPMs is provided that is able to share latency information. The latency information may be used to (i) determine whether to enable and/or execute in-vehicle applications (referred to as "applications"), (ii) best network routes for signal transmission, and/or (iii) best vehicle routes for vehicles to follow. The latency characterization and prediction includes determining a current latency status, determining latency trends, and predicting latency characteristics. The latency characterization is based on probabilistic modeling that allows for calculating confidence intervals for expected latencies. This information is provided based on contextual parameters and information, if the contextual parameters and information are available. Some examples of contextual parameters and information are: a number of vehicles connected to and utilizing network services within a given geographical area; an amount of data to be sent, an identification of the geographical area; a date; a day of the week; a time of day; whether it is a holiday; current weather conditions; whether a major event is occurring; vehicle traffic data; etc. The latency characterization and prediction is also based on other parameters and information as further described below.

Figure 2:
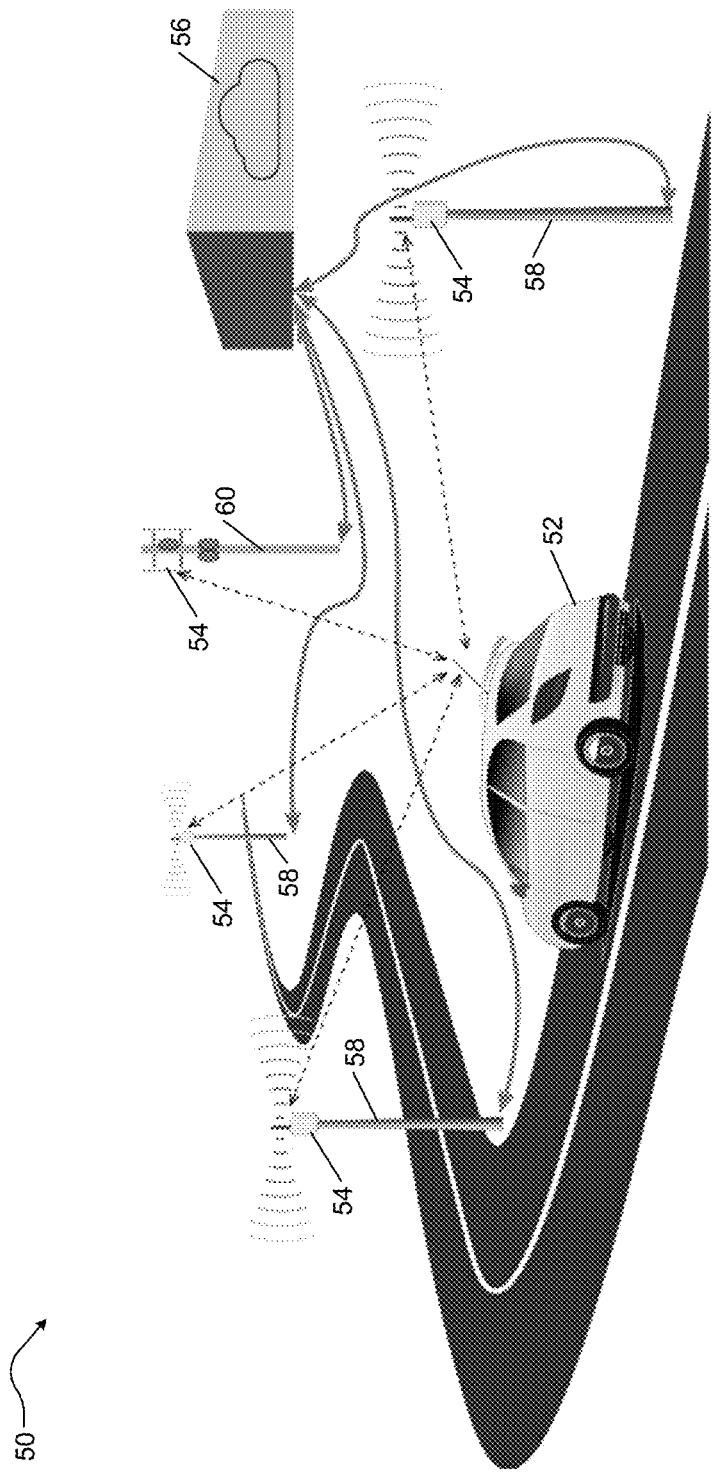
FIG. 2 is a perspective view of an example of a vehicle application enabling and network routing system in accordance with an embodiment of the present disclosure.
Figure 6:
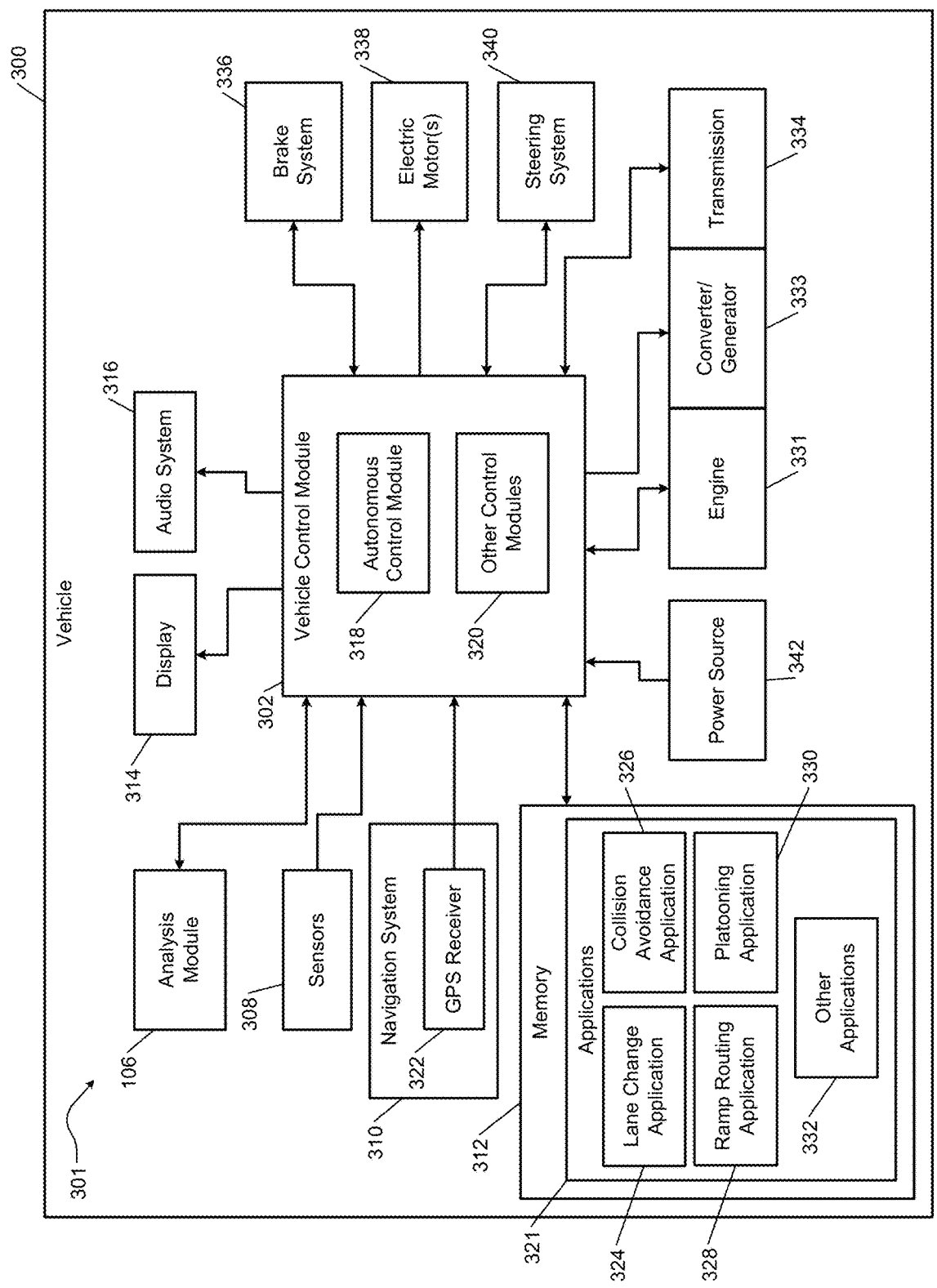
FIG. 6 is a functional block diagram of an example of a vehicle in accordance with an embodiment of the present disclosure.

FIG. 2 shows a vehicle application enabling and network routing system 50 that includes a vehicle 52, RSDs 54, and a cloud-based datacenter 56. The vehicle 52, the RSDs 54, and the cloud-based datacenter 56 may be implemented as nodes 12 of FIG. 1 and/or as other nodes described herein. The RSDs 54 provide location specific information to the vehicle 52, whereas the cloud-based datacenter 56 may provide local and/or non-local information to the vehicle 52. For example, one of the RSDs 54 may indicate to the vehicle environmental information in a local area of the RSD, such as indicate existence of pedestrians and/or other vehicles, provide signal light status updates, provide road conditions, etc. The cloud-based datacenter 56 may provide environmental information associated with each geographical area of the RSDs 54 and/or the cloud-based datacenter 56. A vehicle control module (an example vehicle control module is shown in FIG. 6) of the vehicle 52 may enable one or more applications based on the information received from the RSDs 54 and/or the cloud-based datacenter 56.

The cloud-based datacenter 56 may be implemented in the cloud-based network 14 of FIG. 1. The RSDs 54 may be implemented on poles 58 along a road, at a cell tower 60, or on some other structure. Each of the RSDs 54 may communicate and share information with any number of vehicles. The shared information may include data collected from one or more cameras and/or other sensors. The cameras and/or sensors may be located at the RSDs 54. Each RSD 54 may share information received from other RSDs, nodes and/or network devices. The cell tower 60 may provide network connectivity for the nodes and/or the cloud-based datacenter 56. In one embodiment, the cell tower 60 is not implemented as a node in the vehicle application enabling and network routing system 50, but rather simply provides connectivity services.

In one embodiment, each ASLCPM of the nodes of FIGS. 1 and 2 collects (i) latency data associated with a corresponding node of that ASLCPM (or first ASLCPM), and/or (ii) latency data of other nodes having ASLCPMs directly connected to the first ASLCPM. In another embodiment, a first ASLCPM of a node of FIGS. 1 and 2 collects latency data from other ASLCPMs along a selected route and/or along possible routes of a corresponding vehicle of the first ASLCPM. Each of the ASLCPMs of vehicles may perform in this manner. Each of the ASLCPMs of the vehicles may collect latency data associated with typical routes of the vehicles for frequent destinations. In another embodiment, the ASLCPMs may share latency information, such that when a first node is not connected to a second node, an ASLCPM of the first node can estimate latency for communicating with the second node by receiving latency information associated with the second node from ASLCPMs of one or more other nodes. The stated latency information may be stored in memories of the nodes and/or in cache of the ASLCPMs.

The cloud-based datacenter 56 and/or the servers 20 of the cloud-based network 14 of FIG. 1 may have more processing power and a larger storage for processing and storing latency and contextual information than nodes implemented as vehicles and/or RSDs. For this reason, in another embodiment, the cloud-based datacenter 56 (or cloud-based node) includes a full-scale HLDM. The HLDM collects latency data measured by the LCPMs of FIGS. 1-2 and characterizes the latency data. The latency data and the results of the characterization may be stored along with corresponding contextual information in memory of the cloud-based datacenter 56. The HLDM may alternatively be located at some other regional or centrally located node. A HLDM may be located at any of the nodes. In an embodiment, each of the nodes includes at least a partial-scale HLDM.

In an embodiment, the HLDM implemented in the cloud-based network 14 characterizes the latency data and contextual information and provides tables, equations, models, distributions, metrics, etc. to one or more of the other nodes. This simplifies processing and storage at the other nodes and may increase speed at the other nodes in (i) determining expected latencies, and (ii) deciding whether to enable or execute applications.

Figure 3:
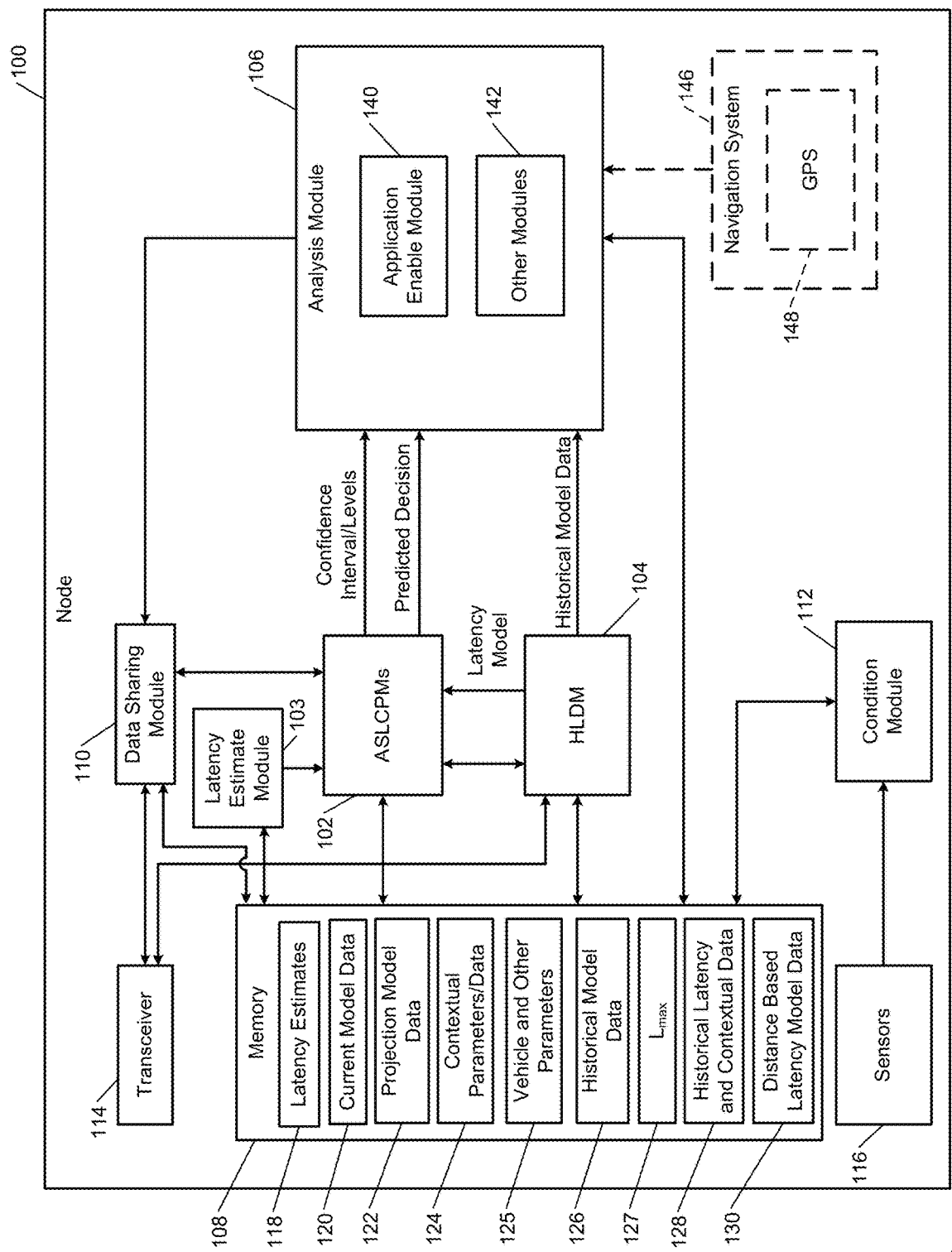
FIG. 3 a functional block diagram of an example of a node in accordance with an embodiment of the present disclosure.

FIG. 3 shows a node 100. The nodes of FIGS. 1-2 may be structured as the node 100. The node 100 may include ASLCPMs 102, a latency estimate module 103, a HLDM 104, an analysis module 106, a memory 108, a data sharing module 110, a condition module 112, a transceiver 114 and sensors 116. The sensors 116 may include cameras, objection detection sensors, temperature sensors, and/or other sensors that provide parameters and/or data associated with the state of the node 100 and/or an environment in which the node 100 is located. The parameters and data may include context data. The ASLCPMs 102 and/or the data sharing module 110 may receive and/or calculate latency estimates 118 and store the latency estimates 118 in the memory 108. The ASLCPMs 102 determine confidence levels, projection data and make predicted decisions based on the latency estimates 118, which is described below with respect to the method of FIG. 12. As described below, this may include generating current model data 120 and projection model data 122. The current model data 120 and the projection model data 122 may be collectively referred to as "model data" and be generated based on various parameters and contextual data 124. The ASLCPMs 102 may store the data 120, 122, 124 in the memory 108. The confidence level and the projection data are provided to the analysis module 106.

The transceiver 114 and sensors 116 may receive and/or determine various vehicle parameters and other parameters (e.g., link data rates, amounts of data to be transferred, link protocols, etc.). The vehicle parameters and other parameters are designated 125 and stored in the memory 108. The ASLCPMs 102 may receive the vehicle and other parameters 125 and, based on this information, determine confidence interval levels, projection data and make predicted decisions. The latency estimate module 103 may determine latency estimates as further described below. The latency estimates may be provided to the ASLCPMs 102. Although shown separate from the ASLCPMs 102, each of the ASLCPMs may include a version of the latency estimate module 103.

The HLDM 104 generates historical model data 126 based on historical latency and contextual data 128. This may include generating distance based latency model data 130. The HLDM 104 may store the data 126, 128, 130 in the memory 108.

The analysis module 106 may include an application enable module 140 and other modules 142. The application enable module 140 enables (or permits) and/or initiates execution of applications implemented within a vehicle based on the confidence levels, the projection data, the predicted decisions and/or other related information received from the ASLCPMs 102. The other modules 142 may include a network route module, a travel route module, and/or other modules. The other modules 142 may operate based on the confidence levels, projection data, predicted decisions, historical model data, and/or other related information, such as that provided by a navigation system 146. The navigation system 146 may include a global positioning system (GPS) 148.

Figure 4:
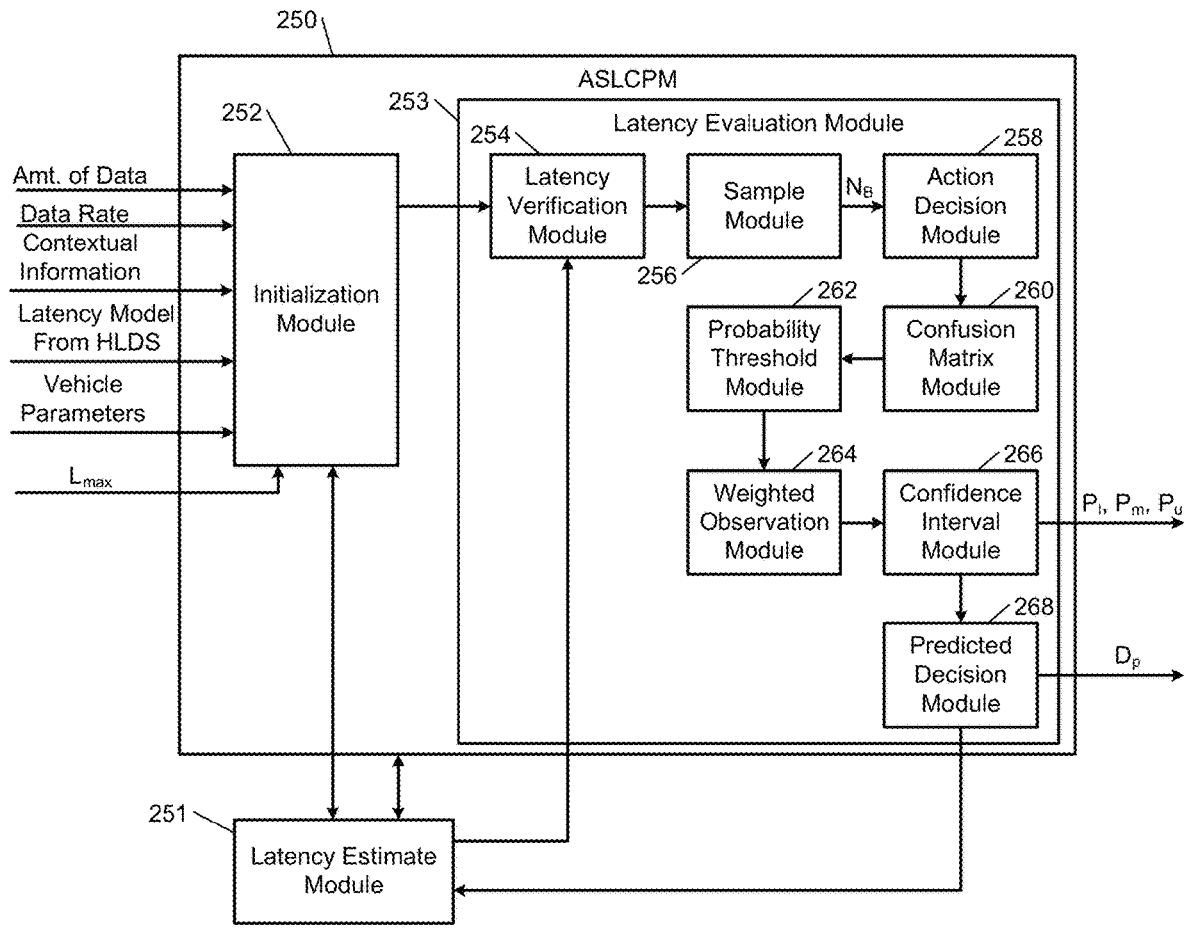
FIG. 4 is a functional block diagram of an example of an ASLCPM and a latency estimate module in accordance with an embodiment of the present disclosure.

FIG. 4 shows an ASLCPM 250 and a latency estimate module 251. The ASLCPM 102 of FIG. 3 may be configured as the ASLCPM 250. The ASLCPM 250 may include an initialization module 252 and a latency evaluation module 253, which may include a latency verification module 254, a sample module 256, an action decision module 258, a confusion matrix module 260, a probability threshold module 262, a weighted observation module 264, a confidence interval module 266, a predicted decision module 268.

The latency estimate module 251 and/or initialization module 252 may receive latency estimates $[t_1, t_2, \ldots, t_N]$ from other nodes, amounts of data (in number of bits) to be transferred, and/or data rates (in bits/second) associated with transferring the data. The latency estimates may be obtained using ping or timestamp based methods and/or via other methods. The latency estimate module 251 may provide the latency estimates to the initialization module 252. The latency estimates combine the following effects: (i) propagation (time needed for a signal to propagate a transmission medium), (ii) processing (time needed to process a data header) and (iii) queueing (time the packet is waiting in the processing queue). The initialization module 252 may calculate latencies (or time delays) based on the data rates of one or more links involved and the amounts of data being transferred on each link.

The latency evaluation module 253 implements a latency evaluation algorithm, which includes determining confidence interval parameters and a predicted decision based on (i) latency estimates, (ii) a predetermined maximum latency for a particular application, and (iii) initialization parameters. The application enable module 140 of FIG. 3 determines whether to enable the application based on the confidence interval parameters and the predicted decision. The latency evaluation module 253 may calculate a confidence interval of a probability that an application latency requirement, such as a maximum latency $L_{max}$. The maximum latency $L_{max}$ may be received as an input at the initialization module 252 and/or the latency evaluation module 253. This calculation accounts for transmission delay or the time needed to send a predetermined amount of data, which depends on a data rate of a link and the amount of data being sent.

The initialization module 252 may also receive contextual information, a latency model from HLDM, and vehicle parameters, such as a number of nearby vehicles in a certain geographical area, a number of vehicles in communication with a host vehicle and/or a road side device, speeds of the vehicles, direction of travel (or bearing) of the vehicles, the types of the vehicles, etc. The contextual information may include object locations, times of day, dates, weather conditions, local incidents, number of connected devices, major events, holidays, etc. This information may significantly enhance and improve precision of latency characterizations and predictions by effectively capturing network usage trends for the corresponding operating conditions. The vehicle parameters may also significantly enhance latency characterizations and predictions since the activity of the vehicles may affect network load and resources, such as available wireless bandwidth, interference, available backhaul, etc.

The latency verification module 254 determines whether a current estimated latency is less than a predetermined maximum latency for a particular application and generates a latency verification sample indicating the same. The sample module 256 buffers a predetermined number of samples generated by the latency verification module 254.

The action decision module 258 determines whether to set an activation decision to True based on the generated samples.

The confusion matrix module 260 determines and/or updates confusion matrix statistics including a number of true positives (TPs), true negatives (TNs), false positives (FPs), and false negatives (FNs). The TPs refer to times when an application was executed and the corresponding latency requirement for the application was satisfied. The TNs refer to times when an application was not executed and the corresponding latency requirement for the application would not have been satisfied. The FPs refer to times when an application was executed, but the corresponding latency requirement for the application was not satisfied. The FNs refer to times when an application was not executed, but the corresponding latency requirement for the application would have been satisfied.

The confusion matrix module 260 operates to minimize the number of FPs and FNs. In one embodiment, the latency evaluation module 253 sets a first predetermined maximum number of allowable FPs to limit a number of FNs. The latency evaluation module 253 may allow the number of FPs to be increased to reduce the number of FNs below a second predetermined maximum number. The probability threshold module 262 determines and/or updates a probability threshold as further described below.

The weighted observation module 264 weights observations based on age. The older the observation the lower the weighting for that observation. The confidence interval module 266 may calculate latency confidence intervals and/or levels and latency projection data, which may include calculating transmission delays (time needed to transmit and/or receive a predetermined amount of data). This may include transmission times and response times and/or a sum thereof. The transmission delays depend on the corresponding data transmission rates involved and the amounts of data being transferred. The predicted decision module 268 provides predicted decisions of whether latencies for current operating conditions satisfy latency requirements, such as a maximum latency $L_{max}$ for a particular application.

The latency estimate module 103 of FIG. 3 may be implemented as the latency estimate module 251 of FIG. 4. The latency estimate module 251 may characterize latency estimates, as obtained during below described operation 402A of the method of FIG. 12. In an embodiment, the last predetermined number N of latency estimates is characterized during a characterization mode. This includes probabilistic modeling, for example, estimating parameters of a normal distribution and/or creating one or more other characterization models. This may include calculating latency probability model parameters and calculating a latency confidence interval and/or level. In an embodiment, the latency estimates are characterized by generation of a model, which in one embodiment is in the form of a probability density (or distribution) function (PDF) curve. Other model estimation methods may be performed including a Gaussian distribution method, a Half-normal distribution method, a method including a mixture of Gaussian functions, a Gamma distribution method, and/or other modeling method. A cumulative density (or distribution) function curve may be generated based on the PDF curve. The latency confidence interval and/or level may be determined based on the CDF curve.

The latency estimate module 251 may determine a trend based on the latency estimates. A last predetermined number M of latency estimates are used for trend analysis during an analysis mode. This may include using regression methods (linear and non-linear methods), auto-regression methods, auto-regressive-moving-average models, auto-regressive integrated moving average methods, Kalman filter prediction methods, trend following methods, neural networks, deep learning methods, and/or other trend analysis and/or machine learning techniques. This may include generating an estimated and projected trend line (or curve). As an example, the trend line may be determined based on averages of the latency estimates for predetermined points in time or predetermined periods of time. The latency estimate module 251 may generate projected latency estimates based on the trend line and/or the previously obtained latency estimates. The latency estimate module 251 may characterize the projected latency estimates. This may include generating a PDF curve and a CDF curve based on the projected latency estimates instead of the obtained latency estimates.

Operations of the modules 250, 251, 252, 254, 256, 258, 260, 262, 264, 266 are further described below with respect to the method of FIG. 12.

Figure 5:
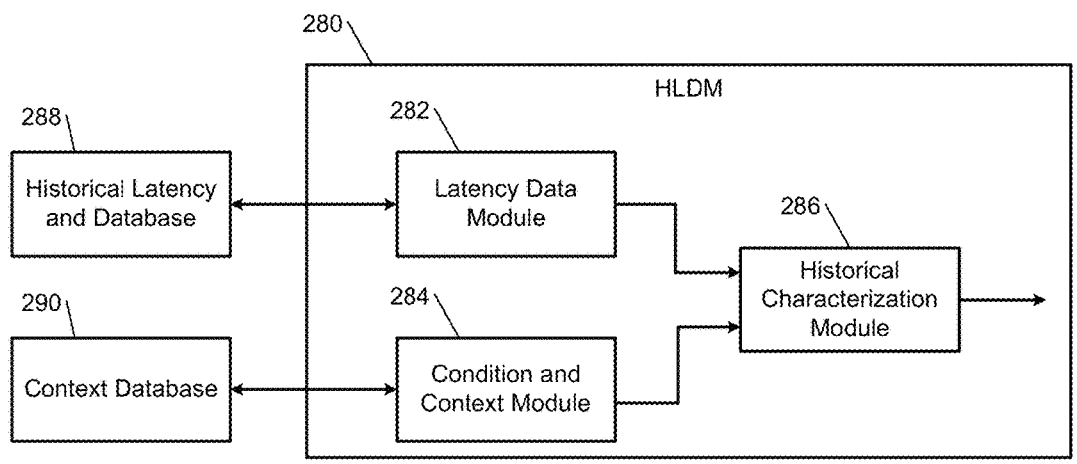
FIG. 5 is a functional block diagram of an example of a HLDM in accordance with an embodiment of the present disclosure.

FIG. 5 shows a HLDM 280. The HLDM 104 of FIG. 3 may be configured as the HLDM 280. The HLDM 280 may include a latency data module 282, a condition and context module 284, and a historical characterization module 286. The latency data module (or first data module) 282 may access a historical latency database 288. The condition and context module (or second data module) 284 may access a context database 290. The historical latency database 288 stores historical latency data for various nodes (e.g., nodes 12 of FIG. 1) and signals and data transferred between the nodes. The context database 290 stores historical context information associated with the historical latency data. Although shown as separate databases, the databases 288, 290 may be implemented as a single database, where the context data is stored with the corresponding historical latency data. Some or all of the historical latency data and the context data may be stored in the memory 108.

The latency data referred to herein may include, for example, propagation latencies of signals, processing latencies of signals and data, and queueing of data latencies associated with the signals. The context data referred to herein may include, for example, vehicle identifiers (IDs), vehicle location information (e.g., latitudes and longitudes), vehicle speeds, vehicle headings and/or bearings, vehicle types, number of vehicles in a geographical area or linked to a network, weather metrics/conditions, time of day, dates, information regarding local incidents, information regarding major events, whether it is a holiday, number of vehicles and/or network devices connected (or linked) to a node, number of vehicles and/or network devices connected to a RSD, amount of data being transferred during a certain period of time across one or more links, etc. The context data including the above-stated parameters and information are used to improve and characterize latency estimates and predictions, as further described below. The stated context data is related to network load and amount of resources being utilized, such as the available wireless bandwidth, the amount of signal interference, the amount of available backhaul, etc. The stated context data may be used to capture network usage trends for the determined conditions. For example, a bad weather event may cause a vehicle traffic jam, which may also cause additional loads in a local network, which can negatively affect performance and increase latencies.

In one embodiment, the modules 251, 253 and 286 of FIGS. 4-5 characterizes latency estimates respectively for current data, future data, and historical data. The modules 251, 253 characterize latency estimates for current collected data, which is used to estimate a current state of a network. This includes identifying whether a latency trend is improving or not. The modules 251, 253 may characterize latency estimates for a last short predetermined period of time, for example, a last predetermined number of minutes or hours. This is in contrast to the operation of the historical characterization module 286, which characterizes latency estimates for a last long predetermined period of time, for example, a last predetermined number of days, months or years. In an embodiment, the context data is then used to improve the characterization of the latency trend and latency predictions. This may include identifying whether the trend is improving or not.

FIG. 6 shows a vehicle 300 that may include a vehicle system 301, which may be implemented as a vehicle application enabling system, a network routing system, and/or a travel routing selection system. The vehicle system 301 may include the modules 102, 104, 106, 110 and 112 of FIG. 3. Of these modules the analysis module 106 is shown in FIG. 6. The vehicle 300 may further include a vehicle control module 302, sensors 308, a navigation system 310, a memory 312, a display 314 and an audio system 316. The vehicle control module 302 may include an autonomous control module 318 and/or other control modules 320, such as an engine control module, a transmission control module, and a motor control module.

The sensors 308 may include cameras, objection detection sensors, temperature sensors, and/or other sensors that provide parameters and/or data associated with the state of the vehicle 300 and/or an environment in which the vehicle 300 is located. The parameters and data may include contextual data. The sensors 308 detect environmental conditions and status of vehicle devices. The navigation system 310 may include a GPS 322. The memory 312 may store the estimates and data stored by the memory 108 of FIG. 3 and applications 321. The applications 321 include a lane change application 324, a collision avoidance application 326, a ramp routing application 328, a platooning application 330, and/or other applications 332.

The vehicle control module 302 may execute the applications 321 and may control operation of an engine 331, a converter/generator 333, a transmission 334, a brake system 336, electric motors 338 and/or a steering system 340 according to parameters, data, values, commands, etc. determined, calculated, estimated, predicted, and/or generated as a result of executing the applications 321. The vehicle control module 302 may receive power from a power source 342 which may be provided to the engine 331, the converter/generator 333, the transmission 334, the brake system 336, the electric motor(s) 338, the steering system 340, etc. The autonomous control module 318 may control operation of the engine 331, the converter/generator 333, the transmission 334, a brake system 336, one or more electric motor(s) 338, and steering system 340. The vehicle control module 302 may generate output signals include warning, alert and/or status signals via the display 314, and/or the audio system 316. As an example, warning signals may be generated when objects are detected to avoid a collision.

The vehicle control module 302 may be in communication with the analysis module 106 as shown and/or any of the modules 102, 104, 110, 112 of FIG. 3. The vehicle 300 may further include a transceiver, such as the transceiver 114 of FIG. 3. The vehicle control module 302 may control operation of the engine 331, the converter/generator 333, the transmission 334, the brake system 336, the electric motors 338 and/or the steering system 340 based on outputs of the analysis module 106 and/or outputs from one or more of the modules 140, 142, 144.

The engine 331, the converter/generator 333, the transmission 334, the brake system 336 the electric motor(s) 338, and the steering system 340 may include actuators controlled by the vehicle control module 302 to, for example, adjust fuel, spark, air flow, throttle position, pedal position, etc. This control may be based on the outputs of the sensors 308, the navigation system 310, and the GPS 322.

One of the other control modules 320 may perform countermeasures to avoid an accident by controlling at least some operations of the vehicle 300. This may include limiting speed of the vehicle, reducing speed of the vehicle, maintaining predetermined distances from objects, changing a lane, changing a direction of travel of the vehicle, generating alert/warning signals, etc.

Figure 7:
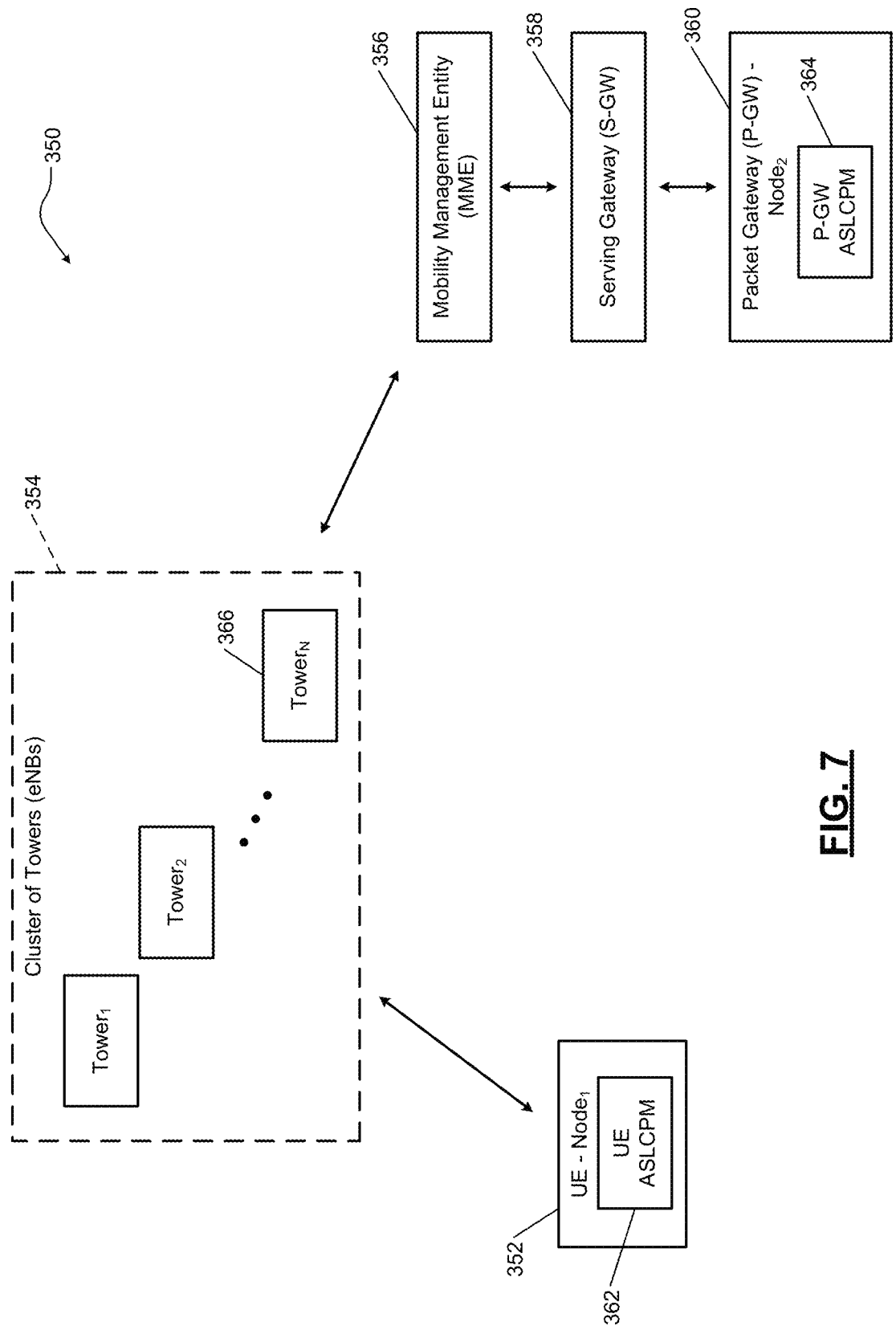
FIG. 7 is a functional block diagram of a network for collecting data for determining data estimates in accordance with an embodiment of the present disclosure.

FIG. 7 shows an example network 350 for collecting data for determining latency estimates. This is one example implementation for data collection, other data collecting networks, systems and/or methods may be implemented. In an embodiment, the collected data is test data. The network includes user equipment (UE) (or Node$_1$) 352, a cluster of towers (or evolved node Bs (eNBs)) 354, a mobility management entity (MME) 356, a serving gateway (S-GW) 358, packet gateway (P-GW) (or Node$_2$) 360. The UE 352 may include a UE ASLCPM 362 and the packet gateway 360 may include a P-GW ASLCPM 364. The cluster of towers 354 may include towers 1-N.

The data may be collected and processed at the UE ASLCPM 362 and/or the P-GW ASLCPM 364. In an embodiment, the data includes signal transfer latency measurements. FIG. 7 is shown as an approximate edge computing scenario, where a first visible or closest node to the UE 352 (e.g., a cell phone), connected to a long-term evolution (LTE) network, is the P-GW 360. Edge computing including processing of the data may be performed at the P-GW 360. An example route from the UE 352 to the P-GW 360 is shown. The route includes passage through a local tower 366, the MME 356 and the S-GW 358.

The MME 356 handles handoffs among the towers in the cluster of towers 354. As an example, the UE 352 may be a cell phone connected to an LTE provider and may implement a custom application that repetitively pings the P-GW 360. In addition to the pings, any relevant corresponding information available is recorded via an application programming interface (API). The information may include global positioning system (GPS) coordinates, GPS speeds, elevation estimates, cell tower identifiers, and signal quality metrics.

Figure 8:
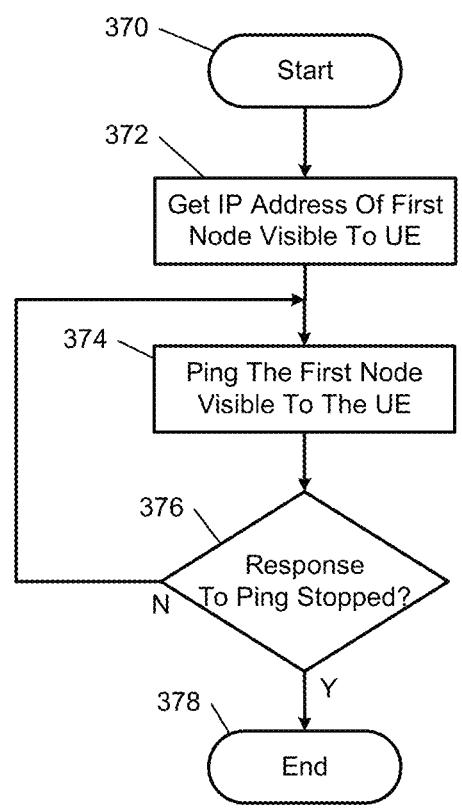
FIG. 8 illustrates a data collection method in accordance with an embodiment of the present disclosure.
Figure 10:
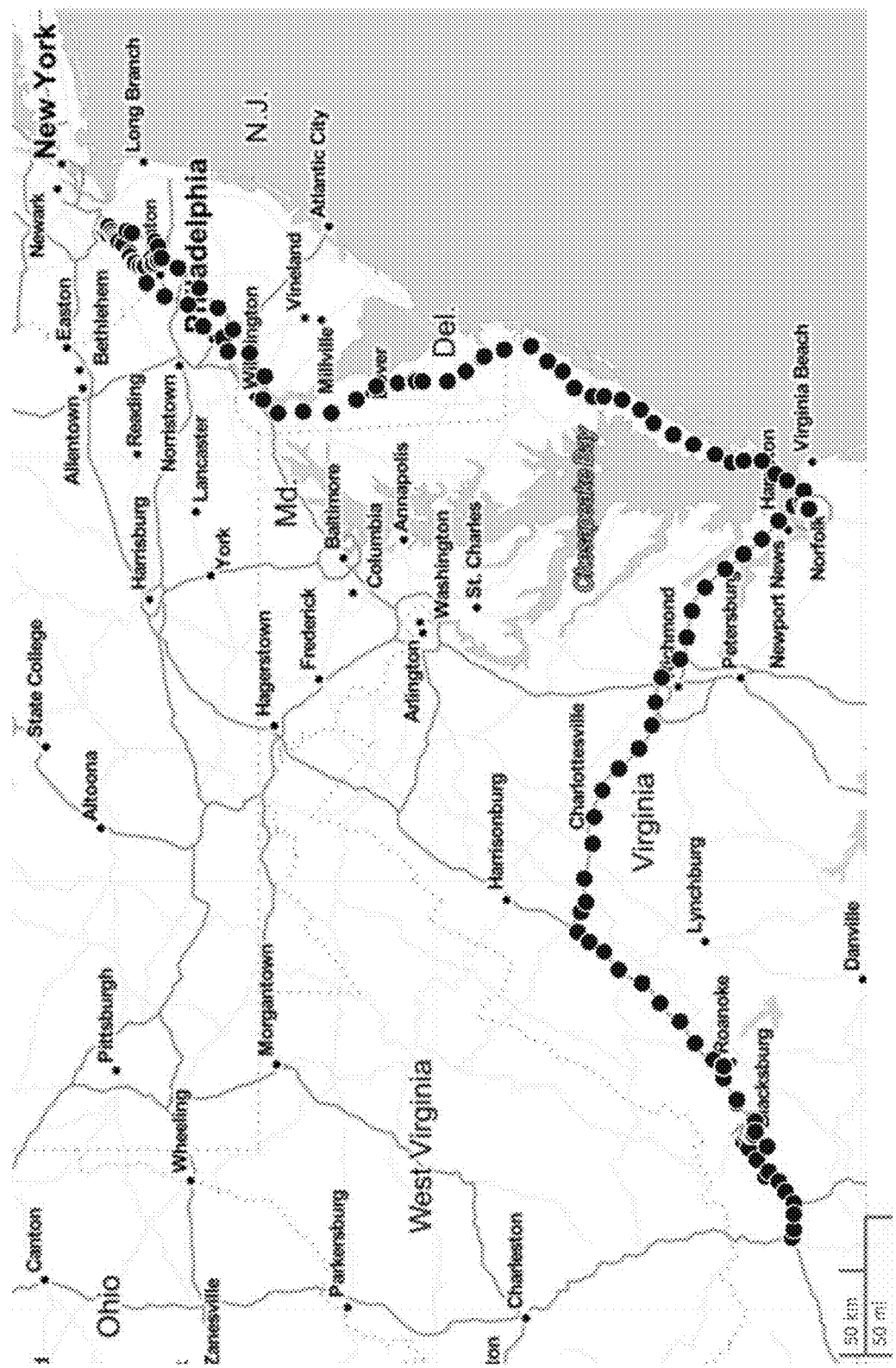
FIG. 10 is an example of a map of recorded data in accordance with an embodiment of the present disclosure.

FIG. 8 shows a data collection method corresponding to the example of FIG. 7. This method may be used for testing and/or latency probing purposes. Other methods may also or alternatively be used for data collection. The method may begin at 370. At 372, the UE ASLCPM 362 gets the Internet protocol (IP) address of the P-GW 360. At 374, the UE ASLCPM 362 pings the P-GW 360 at the IP address for a predetermined period of time and/or until a response to the ping has stopped. Between each ping there is a preset wait time (e.g., 500 milliseconds). At 376, the UE ASLCPM 362 determines whether the predetermined period has lapsed and/or a response to the ping has stopped. If the predetermined period has lapsed and/or the response to the ping has stopped, then the method may end at 378, otherwise operation 374 may be performed. FIG. 10 shows an example map of an area for which data may be recorded as described above with respect to FIGS. 7-8. The area may include mountains, plains, rural roads, urban roads, bridges, tunnels, etc., which provide a diverse environment for testing.

Figure 9:
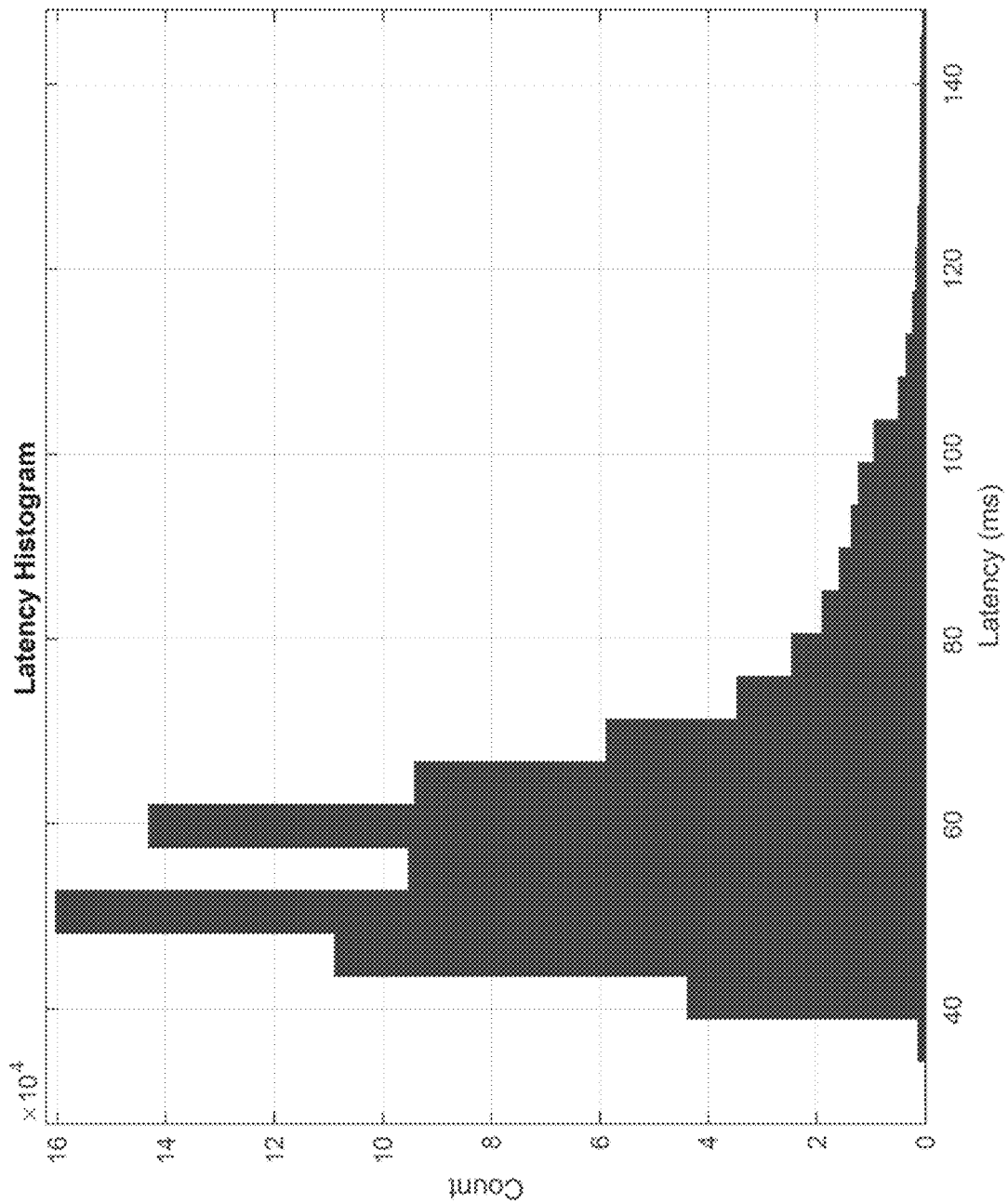
FIG. 9 is an example of a latency histogram of latency values in accordance with an embodiment of the present disclosure.
Figure 11:
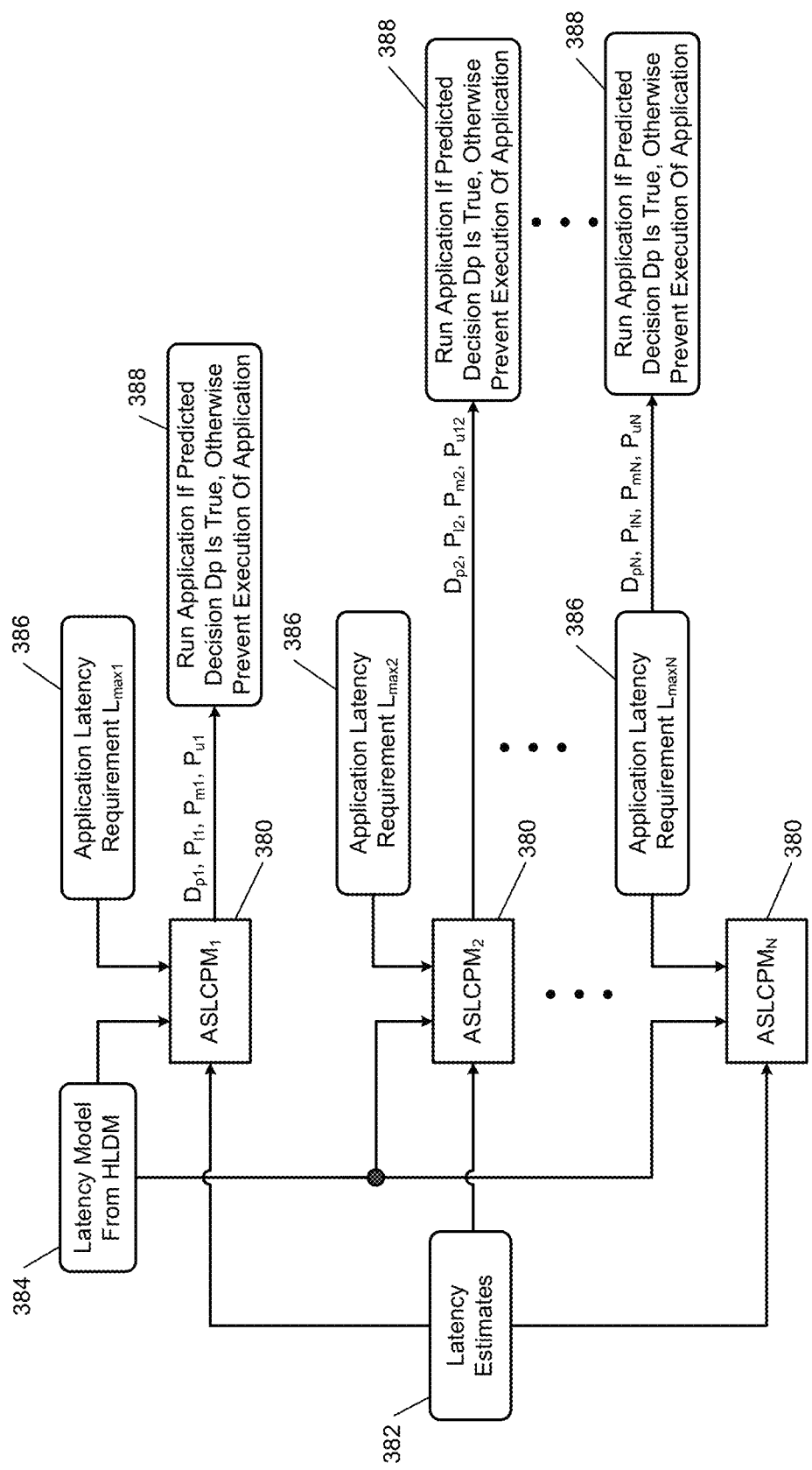
FIG. 11 is an example of a decision making diagram for ASLCPMs in accordance with an embodiment of the present disclosure.

FIG. 9 shows an example of a latency histogram of latency values. The latency histogram is an example latency model that may be received from HLDS as shown in FIGS. 3 and 11-12 and is a summary of recorded latency data samples collected. For the example shown, there are 860,000 data points collected over 144.82 hours. The time between the samples may be on average 606.2 ms with a median of 598 ms, a minimum of 484 ms, a maximum 1182.9 second, and a standard deviation of 598 ms. The latency values may have a mean of 62.3 ms, a median of 58.1 ms, a minimum of 29.6 ms, a maximum of 4656.1 ms, and a standard deviation of 29.1 ms.

FIG. 11 shows a decision making diagram for ASLCPMs 380. The ASLCPMs 380 may be implemented in a vehicle and/or in an edge computing node. The edge computing node may be a first or closest node to a vehicle that is capable of performing data processing to generate predicted decisions, determine confidence interval values, and/or determine whether to execute a particular application. Each ASLCPM is dedicated to one of the applications. The ASLCPMs 380 may receive latency estimates 382 and a latency model 384 from HLDM 104, 280. The ASLCPMs 380 may also receive latency requirements 386 (e.g., maximum latency values $L_{max1-N}$) for each application that may be executed. This execution depends on whether the latency requirement for a corresponding application is satisfied. Each ASLCPM estimates a confidence interval of a probability of a situation satisfying the maximum latency value $L_{max}$ of the corresponding application. Decision blocks 388 are shown indicating that applications are executed if predicted decisions $D_{p1-N}$ are true, otherwise the applications are prevented from being executed. The determination of whether to execute the applications may be based on confidence interval values $P_{l1-N}$, $P_{m1-N}$, and/or $P_{u1-N}$, where $P_{l1-N}$ are the lower bound confidence interval values, $P_{m1-N}$ is the mean confidence interval values, and $P_{u1-N}$ are the upper bound confidence interval values. The lower, mean and upper bound confidence values may be used to assess the confidence of the predicted decisions.

Figure 12:
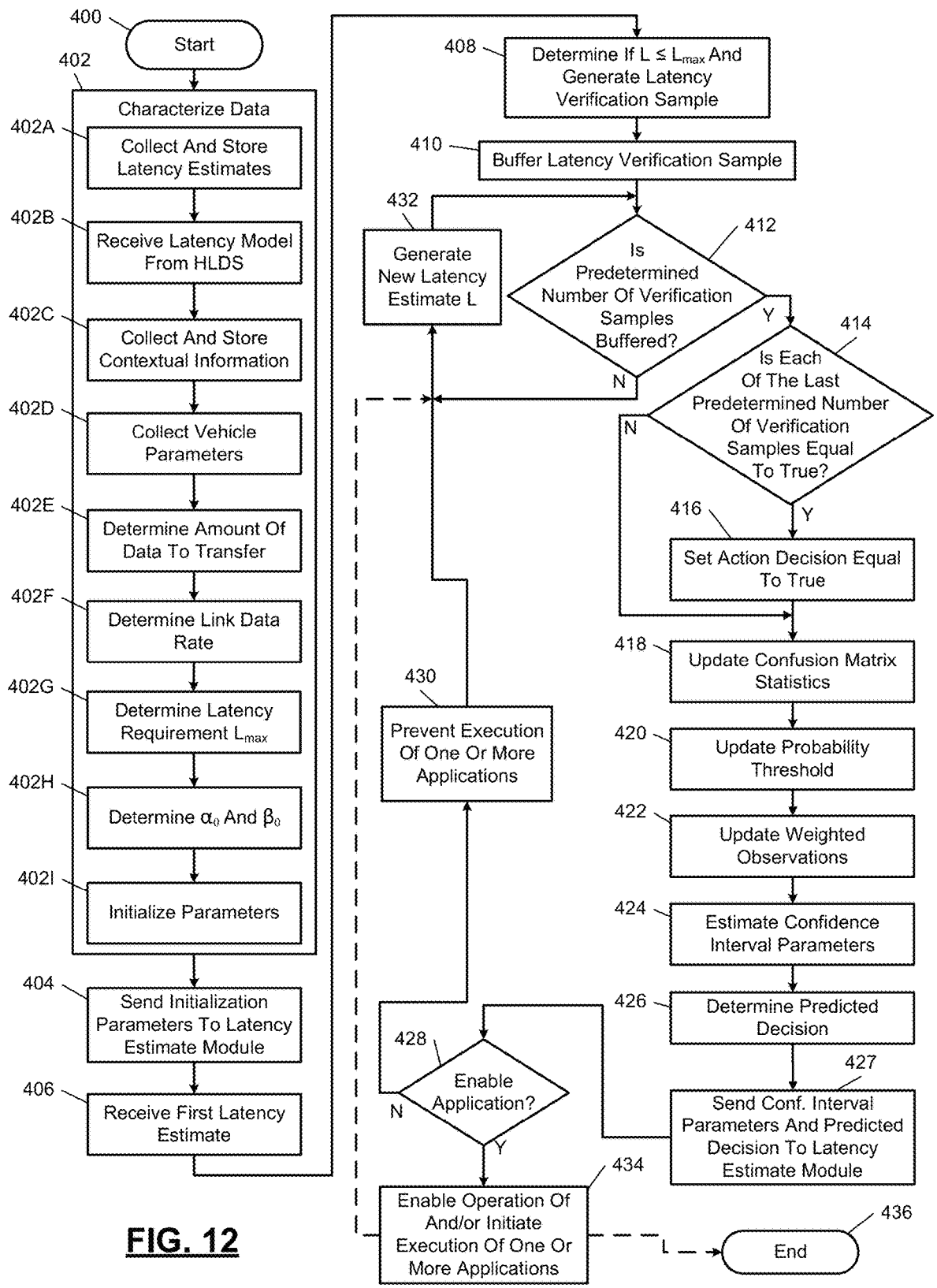
FIG. 12 illustrates an example application enabling and executing method in accordance with an embodiment of the present disclosure.

The systems disclosed herein may be operated using numerous methods, an example method is illustrated in FIG. 12. In FIG. 12, an example application enabling method is shown. The method provides a framework for making latency estimates actionable including permitting or preventing execution of an application based on the latency estimates. Although the following operations are primarily described with respect to the implementations of FIGS. 1-7, the operations may be easily modified to apply to other implementations of the present disclosure. The operations may be iteratively performed.

The method may begin at 400. At 402, the initialization module 252 characterizes data to initialize parameters. The initialize parameters may be determined for each application of concern and the following operations may thus be performed for each application. At 402A, the initialization module 252 collects, calculates and/or stores latency estimates as described above. This may occur during a data collection mode of operation. The latency estimates may be determined based on data rates of links involved, amounts of data being transferred, and/or other associated information.

At 402B, the initialization module 252 may receive a latency module from HLDS, as described above. At 402C, the initialization module 252 may also collect and store contextual (or context) information corresponding to the latency estimates. Example contextual information is described above. At 402D, the initialization module 252 may collect vehicle parameters, some of which are stated above.

At 402E, the initialization module 252 may be provided with and/or determine an amount of data to be transferred. At 402F, the initialization module 252 may be provided with and/or determine a link data rate. At 402G, the initialization module 252 may be provided with and/or determine one or more latency requirements for a respective application for which a determination is to be made as to whether the application is to be executed.

At 402H, the initialization module 252 may be provided with and/or determine prior information values $\alpha_0$ and $\beta_0$, which are a number of successes and a number of failures with regards to whether latency requirements for the application were previously satisfied for similar or same conditions and situation. The prior information values ao and $\beta_0$ may be stored in the memory 108. As an example, prior information values ao and $\beta_0$ may be determined based on the corresponding latency model, the probability that a latency L for current conditions and situation is less than or equal to the maximum latency $L_{max}$, and a selected number of latency verification samples n. The latency model may include, for example, mixtures of normal, log-normal, and/or shifted exponential distributions, a double Pareto Log-Normal distribution, or a generalized Pareto distribution. The number of latency verification samples n may be based on a number of latency verification samples used to estimate an original model or a fraction of the effective number of latency verification samples $n_e$. The number of latency verification samples n may be equal to a number of latency verification samples buffered $n_B$. As an example, equations 1-5 may be satisfied, where f is a value greater than or equal to 1, $\mu$ is the mean, $\sigma$ is the variance, and $\gamma$ is a forgetting factor.

$$\alpha_0 = n\mu \tag{1}$$

$$\beta_0 = n(1-\mu) \tag{2}$$

$$n_e = \frac{1}{(1-\gamma)} \tag{3}$$

$$n = \frac{\mu(1-\mu)}{\sigma^2} \tag{4}$$

$$n = \leq \frac{n_e}{f} \tag{5}$$

When the mean $\mu$ and variance $\sigma^2$ of the probability that $L \leq L_{max}$ is available from prior information/models, the prior information values $\alpha_0$ and $\beta_0$ are able to be determined according to equations 1-5.

At 402I, the initialization module 252 may initialize parameters, such as a percentage of occurrences that the latency maximum requirement is not satisfied $\delta$, a distribution value z that is based on $\delta$, an acceptable false positive rate $R_{fpmax}$, a binomial proportion $\eta$, an acceptable maximum deviation d, and the forgetting factor $\gamma$. This may be accomplished using, for example, equations 6-12 (equation 13 is provided as an example and may also be satisfied), where $\Phi$ is a cumulative distribution function of a standard normal distribution.

$$n = \frac{z^2 \eta(1-\eta)}{d^2} \tag{6}$$

-continued $$z = \Phi\left(\frac{1-\delta}{2}\right) \quad (7)$$

$$y(t) = \sum_{i=0}^{N-1} x(i)\gamma^i \quad (8)$$

$$y(t) = \gamma y(t-1) + x_0 \quad (9)$$

$$N_e(t) = \gamma N_e(t) + 1 \quad (10)$$

$$\gamma = 1 - \frac{1}{N_e(t)} \quad (11)$$

$$\gamma = 1 - \frac{d^2}{z^2 \pi \eta (1-\eta)} \quad (12)$$

$$d \leq \frac{R_{fpmax}}{10} \quad (13)$$

Latency verification sample size estimation may be performed to estimate confusion matrix statistics including a number of true negatives $N_{tn}$, a number of false positives $N_{fp}$, a number of false negatives $N_{fn}$, and a number of true positives $N_{tp}$. These statistics may include a true negative rate $R_{tn}$, a false positive rate $R_{fp}$, a false negative rate $R_{fn}$, and a true positive rate $R_{tp}$. An appropriate sample size n is selected in order for a latency estimate to be within ±d range with a probability of 1-δ. From a binomial case, a sample size is provided by equation 6.

When there is more than two categories, then a computationally tedious procedure may be employed. However, an approximation can be made by calculating for the worst case scenario where all parameters of the same type are equal. The parameters provide a table that can be used to estimate the latency verification sample size n for multiple δ given d and a number of non-zero categories.

In an embodiment, where the accuracy of the false positive rate is of concern, a binomial case is addressed, where a first category is the false positive rate and a second category is a sum of the other three categories (i.e. a sum of the true positive rate, the true negative rate and the false negative rate). The same reasoning may be applied if a focus is on the false negative rate or another category, instead of the false positive rate.

The forgetting factor γ is used to weight observations (e.g., latest latency estimates), such that most recent observations are weighted higher than older observations. Given an observation vector x, the weighted sum of last N observations at time-step t may be determined using above equation 8, where the latest observation is at i=0. When the number of last observations N is a high value, equation 8 may be simplified to above equation 9, where $x_0$ is the latest observation and y(t−1) is a weighted sum from a previous time-step. Similarly, the effective number of observations $n_e$ may be determined using equation 10. Solving for the forgetting factor γ provides equation 11 and using the number of observations n at time t from equation 6 provides above equation 12. With equation 12, the forgetting factor γ is estimated based on a predetermined accuracy level. The higher the accuracy level, the closer the forgetting factor γ is to 1 and the more latency verification samples acquired.

At 404, the initialization parameters determined and/or set at 402 are provided to the latency estimate module 251. At 406, the latency estimate module may receive a first latency estimate L. The latency estimate L may be received from the initialization module 252.

The following operations 408, 410, 412, 414, 416, 418, 420, 422, 424, 426 and 427 are associated with the latency evaluation algorithm implemented by the latency evaluation module 253. At 408, the latency verification module 254 determines whether the received latency estimate L is less than or equal to the maximum latency $L_{max}$ of a corresponding application. If L≤$L_{max}$, then a latency verification sample of True is buffered in memory as a last stored sample at 410, otherwise a latency verification sample of False is buffered in memory as the last stored sample 410. The memory may be, for example, the memory 108.

At 412, the sample module 256 determines whether a predetermined number of latency verification samples $n_B$ have been buffered. If the predetermined number of latency verification samples $n_B$ have been buffered, then operation 414 is performed, otherwise operation 432 is performed. The predetermined number of latency verification samples $n_B$ may be preset, calculated and/or received as an input and used to provide a predetermined number of observations.

At 414, the action decision module 258 determines whether each of the last predetermined number of latency verification samples are True (or a logical '1'). If each of the last predetermined number of latency verification samples are True, then the action decision $D_a$ is set to True (or a logical '1') at 416, otherwise operation 418 is directly performed.

At 418, the confusion matrix module 260 updates a confusion matrix including confusion matrix statistics based on the actual decision Da, such the number of true negatives $N_{tn}$, number of false positives $N_{fp}$, number of false negatives $N_{fn}$, number of true positives $N_{tp}$, the true negative rate $R_{tn}$, the false positive rate $R_{fp}$, the false negative rate $R_{fn}$, and the true positive rate $R_{tp}$. For example if $D_a$ is true and the corresponding application was executed, then the number of true positives is incremented. If $D_a$ is true and the application was not executed, then the number of false negatives is incremented. If $D_a$ is false and the corresponding application was executed, then the number of false positives is incremented. If $D_a$ is false and the corresponding application was not executed, then the number of true negatives is incremented.

Above equation 8 may be used to calculate the confusion matrix rates $R_{tn}$, $R_{fp}$, $R_{fn}$, $R_{tp}$, where is the rate being determined and $x_0$ is the new value of 0 or 1. For example the false positive rate may be determined as shown by equation 14.

$$R_{fp} = \frac{N_{fp}}{N_e} \quad (14)$$

The rates $R_{tn}$, $R_{fn}$, $R_{tp}$ may be determined in a similar fashion using similar equations relating $R_{tn}$, $R_{fn}$, $R_{tp}$ to $N_{tn}$, $N_{fn}$, $N_{tp}$ and $N_e$.

At 420, the probability threshold module 262 updates a probability threshold $P_{th}$ using proportional control. The probability threshold module 262 may be implemented as a proportional controller to maintain a predetermined false positive rate $R_{fp}$ within a predetermined range. A proportional gain $K_c$ of the controller may be represented by equation 15, where $R_{fpmax}$ is the maximum acceptable false positive rate.

$$K_c = \frac{100}{R_{fpmax}} \quad (15)$$

An error signal $E_r$ may be represented by equation 16. Equation 17 may be provided using equations 15 and 16 to determine an adjusted probability threshold $P'_{th}$.

$$E_r = R - R_{fpmax} \quad (16)$$

$$P'_{th}(t) = P_{th}(t-1) + K_c E_r \quad (17)$$

A new probability threshold $P_{th}$ may be represented by equation 18.

$$P_{th}(t) = \begin{cases} 0, & \text{if } P'_{th}(t) \leq 0, \\ P'_{th}(t), & \text{if } 0 < P'_{th}(t) < 1, \\ 1, & \text{if } P'_{th}(t) \geq 1 \end{cases} \quad (18)$$

At 422, the weighted observation module 264 updates the weighted observations. This may be accomplished using, for example, equation 9. This may include updating the weights of the last predetermined number of observations and/or buffered latency verification samples. If tracking false positive rates, then there is either a false positive or no false positive for each latency verification sample. For each latency verification sample, one of the confusion statistics (true positive, true negative, false positive, false negative) is True (or a logical '1'), where the other confusion statistics is False (or a logical '0'). This method may include keeping one or more of the confusion matrix statistics (i.e. the number of true negatives $N_{tn}$, number of false positives $N_{fp}$, number of false negatives $N_{fn}$, and number of true positives $N_{tp}$) in one or more predetermined ranges.

At 424, the confidence interval module 266 determines confidence interval values, such as a probability lower bound $P_l$, a probability average $P_m$, and a probability upper bound $P_u$. The confidence interval values may be determined using Baye's Rule, which includes estimating a posterior density $\theta$ after observing the parameter vector y using equation 19, where $p(\theta|y)$ is the likelihood of y as a function of $\theta$ and $p(\theta)$ is a prior density that is indicative of $\theta$.

$$p(\theta|y) \propto p(y|\theta)p(\theta) \quad (19)$$

In the context of the described implementation, the probability that $L \leq L_{max}$, $\theta$ is a probability that $L \leq L_{max}$ and y the observed times and conditions that $L \leq L_{max}$. If the described process is a Bernoulli process, each time step corresponds to a Bernoulli trial, where a success is when $L \leq L_{max}$ and a failure is when $L > L_{max}$. Given $\alpha$ and $\beta$, $\theta$ is beta distributed as represented by equation 20.

$$p(\theta|\alpha,\beta) = Be(\theta;\alpha+1,\beta+1) \quad (20)$$

Equation 20 may apply when no prior information for $\alpha$ and $\beta$ (successes and failures) is provided. Equation 21 may apply when prior information for $\alpha$ and $\beta$ (successes and failures) is provided.

$$p(\theta|\alpha,\beta) = Be(\theta;\alpha+\alpha_0,\beta+\beta_0) \quad (21)$$

For equation 21, $\alpha_0 \geq 1$ and $\beta_0 \geq 1$. If $\alpha_0 = \beta_0 = 1$, then a uniform prior distribution exists.

Using the conditional probability function (CDF) of the beta distribution, the confidence interval values $P_l$, $P_m$, $P_u$ for $\theta$ may be estimated. Specifically, confidence interval values for an interval $\{\theta_l, \theta_u\}$ may be determined, such that with a probability of $1-\delta$, the parameter $\theta$ is between $\theta_l$ and $\theta_u$ (or $\theta \in \{\theta_l, \theta_u\}$).

At 426, the predicted decision module determines a predicted decision $D_p$ based on the probability threshold $P_{th}$ and the probability upper bound $P_u$. If $P_{th}$ is less than or equal to $P_u$, then $D_p$ is set to True (or a logical '1'), otherwise $D_p$ is set to False (or a logical '0').

At 427, the confidence interval parameters $P_l$, $P_m$, $P_u$ and the predicted decision $D_p$ may be sent to the latency estimate module 251. At 428, the latency estimate module 251 may determine whether to enable the application based on the confidence interval parameters $P_l$, $P_m$, $P_u$ and the predicted decision $D_p$. The analysis module 106 and/or the application enable module 140 may determine whether the obtained latency estimates and/or the projected latency estimates are less than the application maximum permitted latency $L_{max}$. If this is True, operation 434 may be performed, otherwise operation 430 is performed. The analysis module 106 and/or the application enable module 140 may also or alternatively determining whether the confidence interval values, corresponding to the projected latency estimate L being less than $L_{max}$ or within a predetermined range, is greater than or equal to a predetermined confidence level. If this is True, operation 434 may be performed, otherwise operation 430 is performed.

As another example, an application may be executed that requires an overall or average latency of less than or equal to 300 ms with a confidence level of 95%. If the obtained or predicted latency estimates including the latency estimate L have an overall or average latency of less than or equal to 300 ms with a confidence level of greater than or equal to 95%, then the application is permitted to be executed, otherwise the application is prevented from being executed. In an embodiment, if the overall or average of the obtained latency estimates satisfy the requirements for executing a certain application and the overall or average of projected latency estimates do not satisfy the requirements, then the application is not permitted to be executed. If the overall or average of the obtained latency estimates do not satisfy the requirements for executing the application and the overall or average of projected latency estimates do satisfy the requirements, then the application is permitted to be executed.

Operation 432 may be performed after operations 430 and 434. In another embodiment, the method ends after performing operation 434, instead of performing operation 432. At 430, the application enable module 140 prevents execution of one or more applications. The application enable module 140 may set the bits to '0' indicating execution of the one or more applications is not permitted. The application enable module 140 may generate a visual or audible warning signal indicating that the application is not permitted to be executed at this time.

At 432, the latency estimate module 251 may generate or obtain a new latency estimate value for L, which may be used during a subsequent iteration of operations 424 and 427. Operation 412 may be performed subsequent to operation 432.

At 434, the application enable module 140 enables operation of and/or initiates execution of one or more applications (e.g., one or more of the applications 321). This may include signaling the vehicle control module 302 that execution of the one or more applications is permitted and/or setting states of one or more flags (or bits) in the memory 312 indicating that execution of the one or more applications is permitted. As an example, the bits may be set to '1' when execution is permitted. A different bit may be set for each application. Each bit may be associated with one or more applications. The vehicle control module 302 may access the bits when determining whether execution of the one or more applications is permitted.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Figure 13:
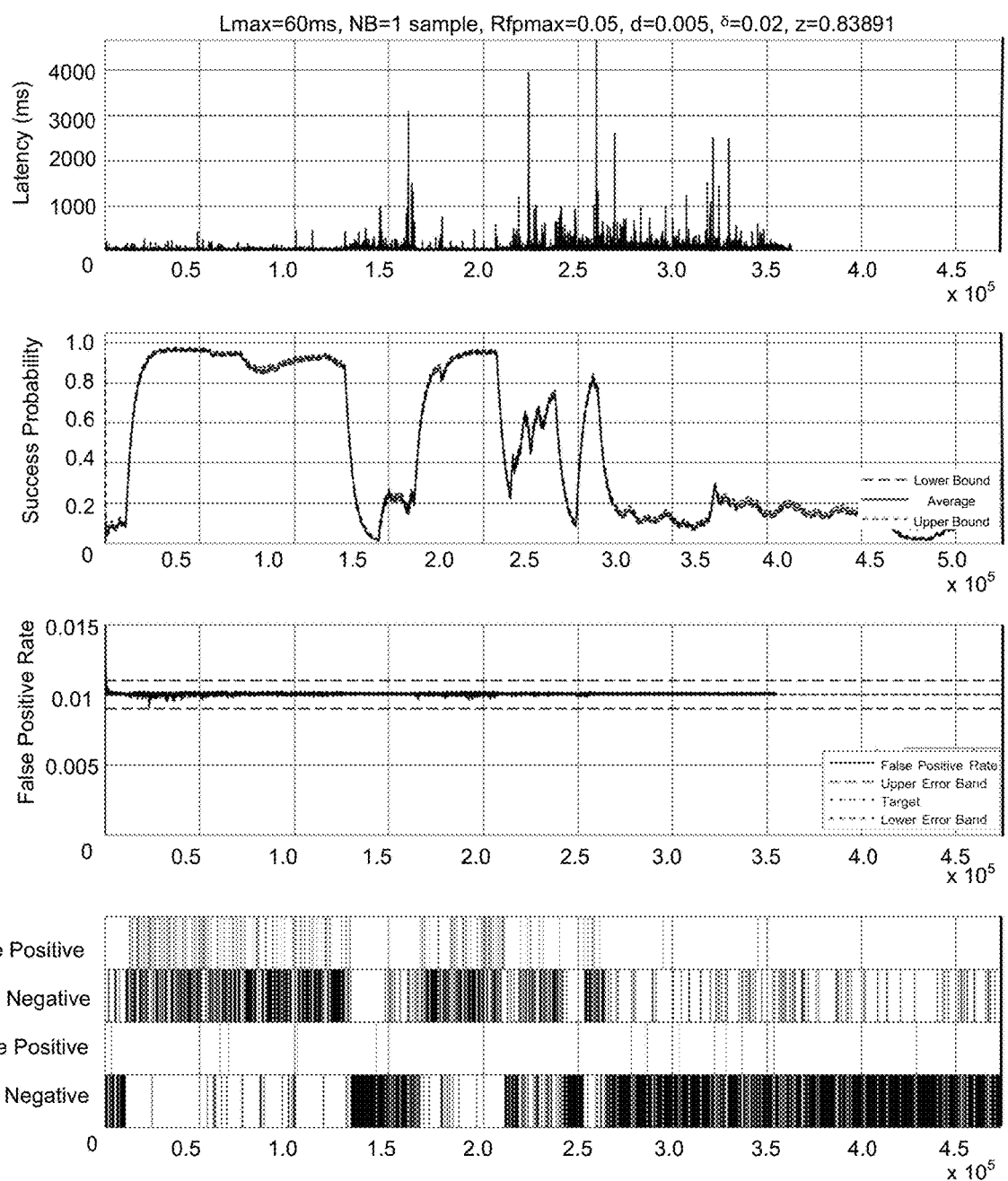
FIG. 13 is a first example operation diagram illustrating latency measurements, success probabilities and confusion matrix statistics for a maximum false positive rate of 1% in accordance with an embodiment of the present disclosure.
Figure 14:
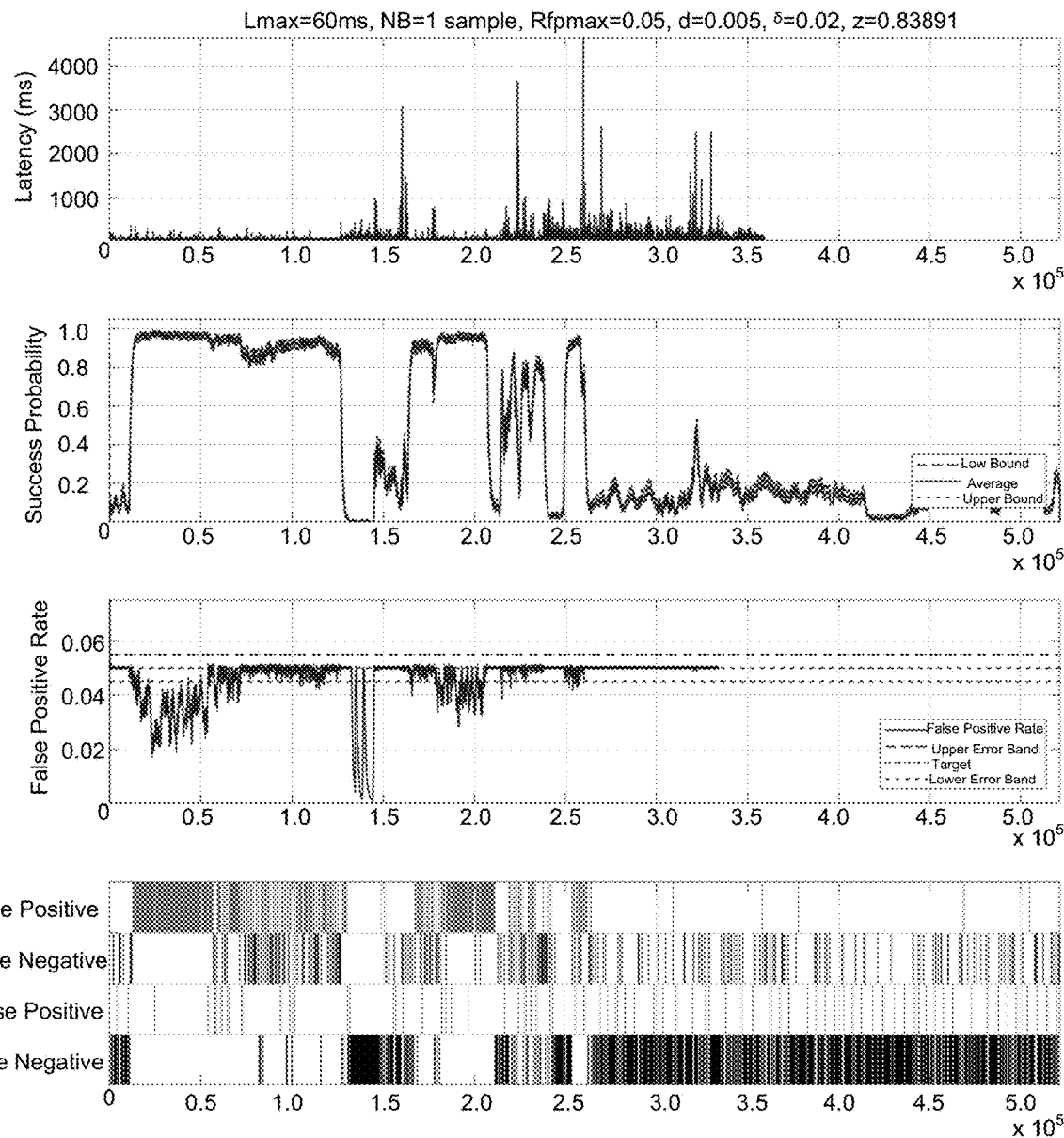
FIG. 14 is a second example operation diagram illustrating latency measurements, success probabilities and confusion matrix statistics for a maximum false positive rate for 5% in accordance with an embodiment of the present disclosure.
Figure 15:
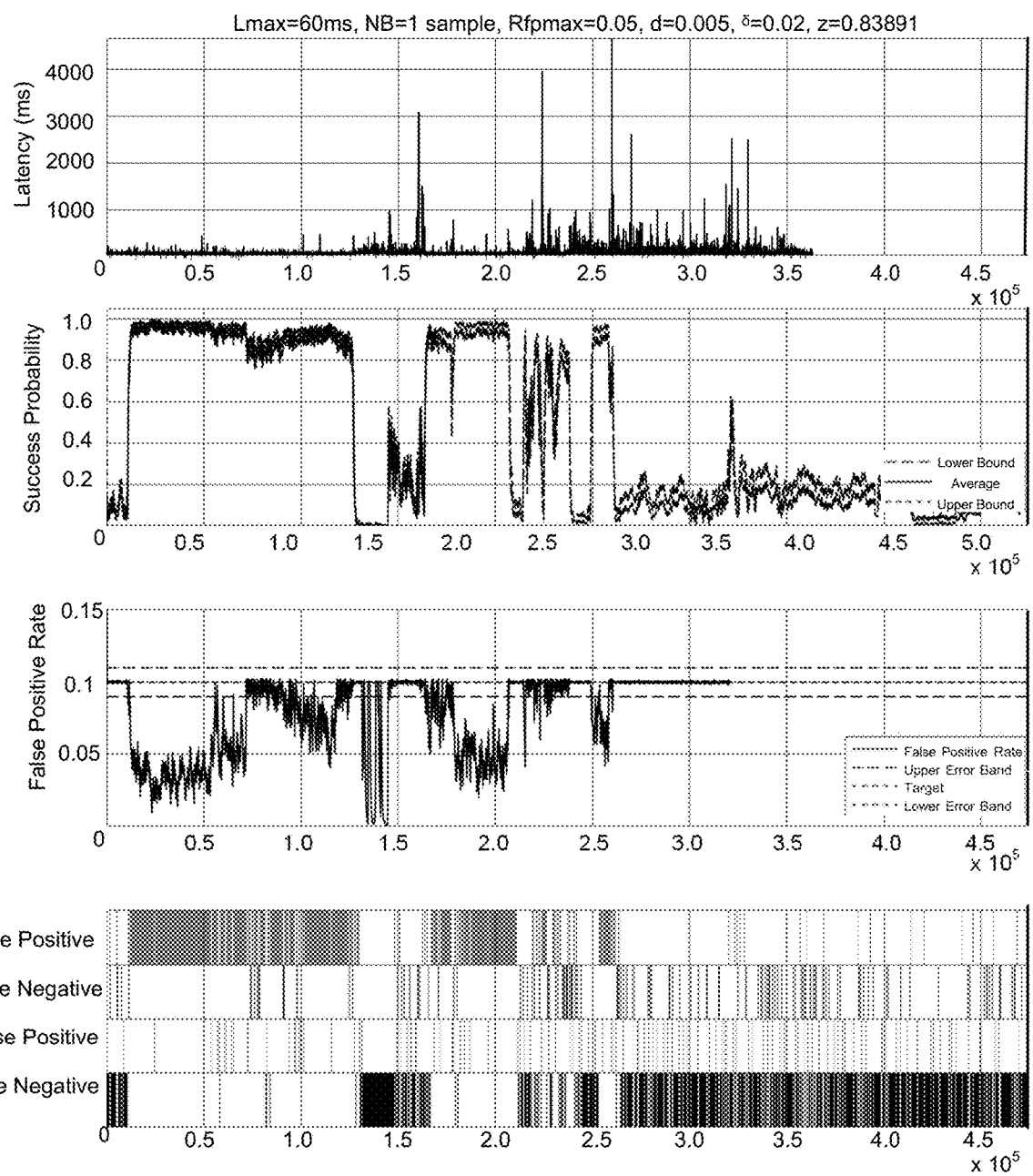
FIG. 15 is a third example operation diagram illustrating latency measurements, success probabilities and confusion matrix statistics for a maximum false positive rate of 10% in accordance with an embodiment of the present disclosure.

FIGS. 13-15 show three example operation diagrams having plots over an operation time period. Each of the diagrams includes 3 plots and a graph over time. The first plots of the diagrams show latency measurements. The second plots of the diagrams are success probabilities having a lower bound, an average and an upper bound. The lower bounds of the diagrams are close to being a same value. Similarly, the averages are close to being a same value. In addition the upper bounds are close to being a same value. In addition, the lower bounds, the averages and the upper bounds are close values. The third plots of the diagrams are corresponding false positive rates. The graph is of a summary of confusion matrix statistics including true positive, false negative, false positive, and true negative occurrences.

The operation diagram of FIG. 13 shows latency measurements, success probabilities and confusion matrix statistics for a maximum false positive rate of 1%. The operation diagram of FIG. 14 shows latency measurements, success probabilities and confusion matrix statistics for a maximum false positive rate for 5%. The operation diagram of FIG. 5 shows latency measurements, success probabilities and confusion matrix statistics for a maximum false positive rate of 10%.

For the diagram of FIG. 13, the false positive rate is 1% and the false negative rate 32.6%. By allowing the false positive rate to increase to 5% and 10%, the false negative rate drops to 14.5% and 8.5%, as respectively shown by FIGS. 14 and 15. At the same time, the true positive rate increases from 9.7% to 27.7% and 33.8% respectively for FIGS. 14 and 15. Thus, the initialization module 252 and/or the confusion matrix module 262 may allow the false positive rate (set the false positive rate $R_{fpmax}$ higher) to increase to cause the false negative rate to decrease. As such, the disclosed system has the flexibility to control the false positive rate and permit a higher false positive rate in exchange for a lower false negative rate and an increased true positive rate. In one embodiment, the algorithm controls the false negative rate instead of the false positive rate.

Further from the false positive rate plots, in the diagram of FIG. 13 the false positive rate remains within determined bounds. In each of the diagrams of FIGS. 13-15, the false positive rate does not exceed the upper error band and has a maximum close to a target rate. As an example, the diagrams are for a $L_{max}$ of 60 milliseconds (ms), which is close to an average latency of 62 ms.

Figure 16:
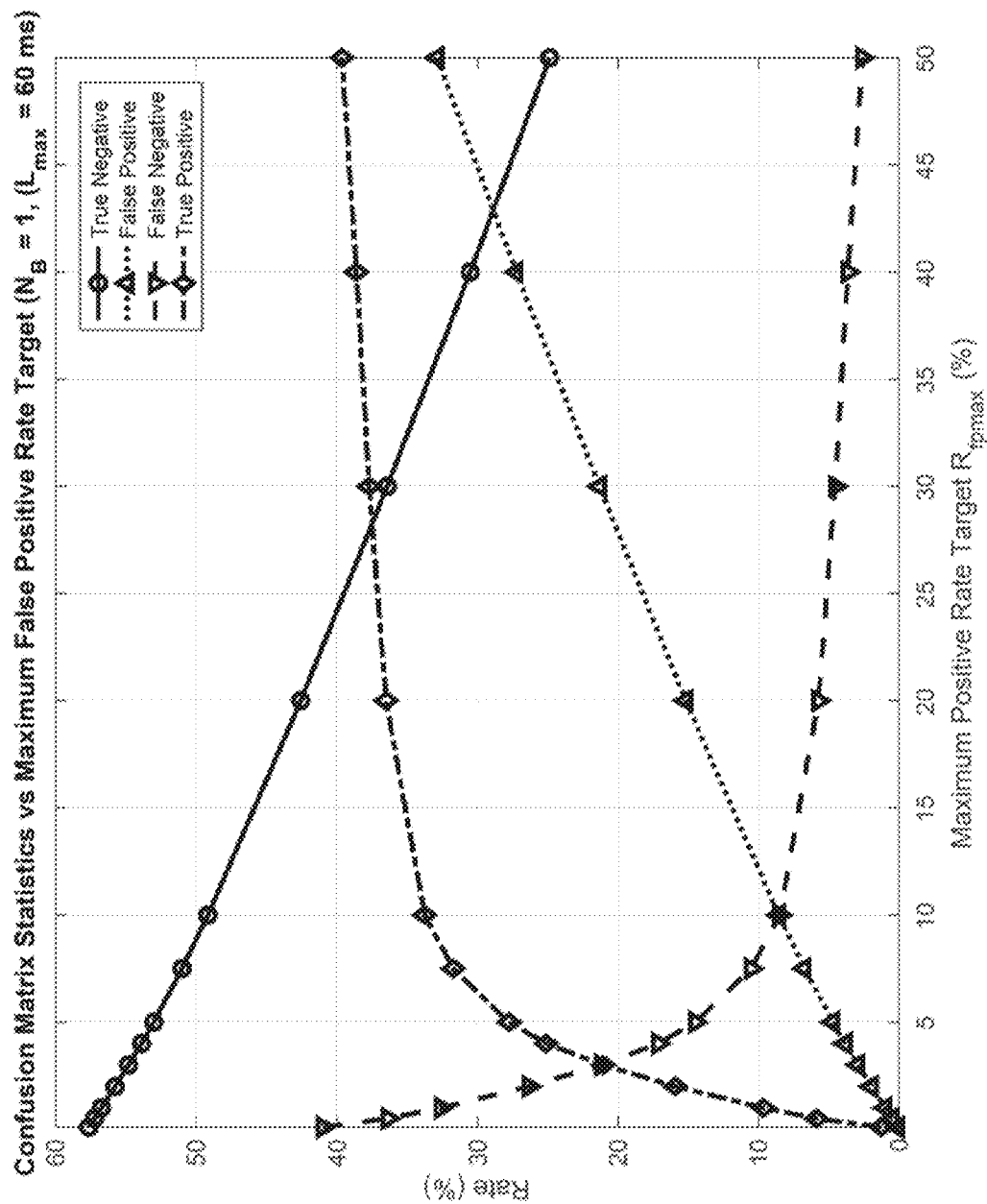
FIG. 16 is an example plot of confusion matrix statistics versus a maximum positive rate target in accordance with an embodiment of the present disclosure.

FIG. 16 shows an example plot of confusion matrix statistics versus a maximum positive rate target. FIG. 16 shows an example of how the confusion matrix statistics change when the maximum false positive rate $R_{fpmax}$ is adjusted. As $R_{fpmax}$ is increased, the plot illustrates that the true negative rate is reduced, the false positive rate is increased, the false negative rate is reduced, and the true positive rate is increased. This also illustrates that the false positive rate can be permitted to increase to decrease the false negative rate and the true negative rate while increasing the true positive rate.

Figure 17:
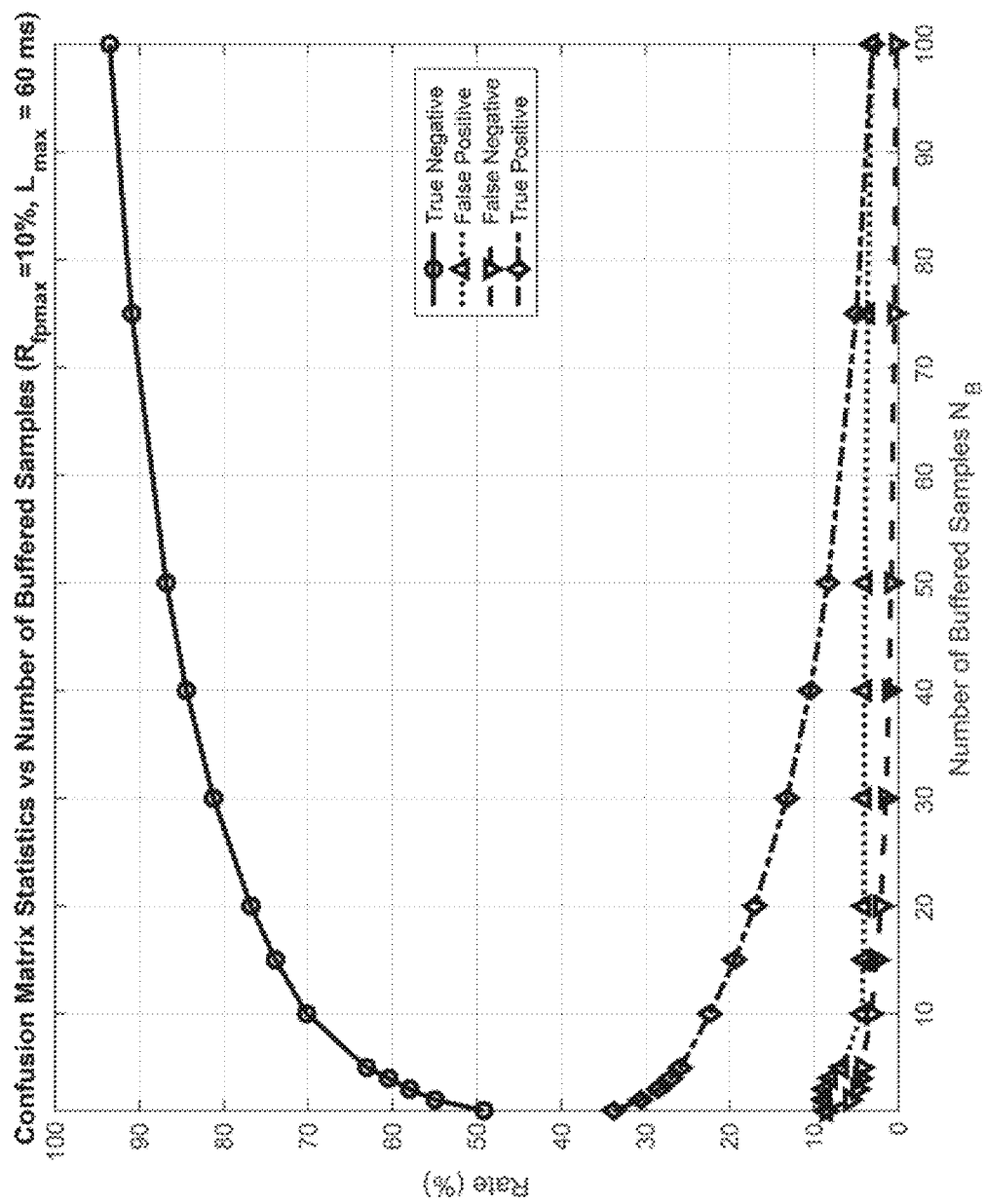
FIG. 17 is an example plot of confusion matrix statistics versus a number of buffered samples in accordance with an embodiment of the present disclosure.

FIG. 17 shows an example plot of confusion matrix statistics versus a number of buffered samples. FIG. 17 shows an example of how the confusion matrix statistics change when the number of latency verification samples $n_B$ is adjusted. As the number of latency verification samples $n_B$ is increased, (i) the true negative rate is increased, (ii) the false positive rate may remain near $R_{fpmax}$ initially and then decrease, and (iii) the false negative rate and the true positive rate decrease. Thus, increasing the number of latency verification samples $n_B$ is a more conservative approach since more consecutive latency measurements need to satisfy the maximum latency requirement $L_{max}$.

Figure 18:
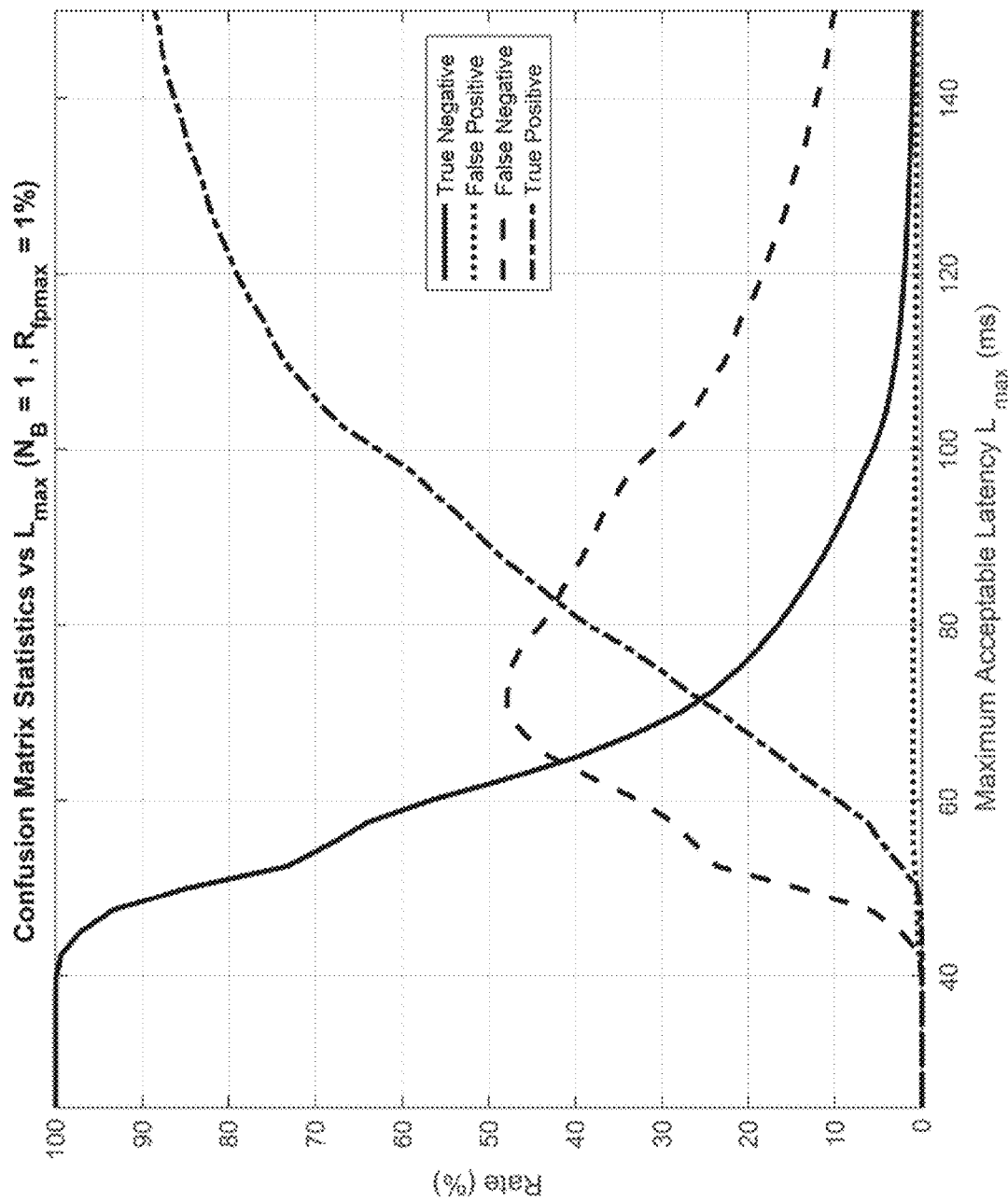
FIG. 18 is an example plot of confusion matrix statistics versus a maximum acceptable latency for a false positive maximum rate of 1% in accordance with an embodiment of the present disclosure.
Figure 19:
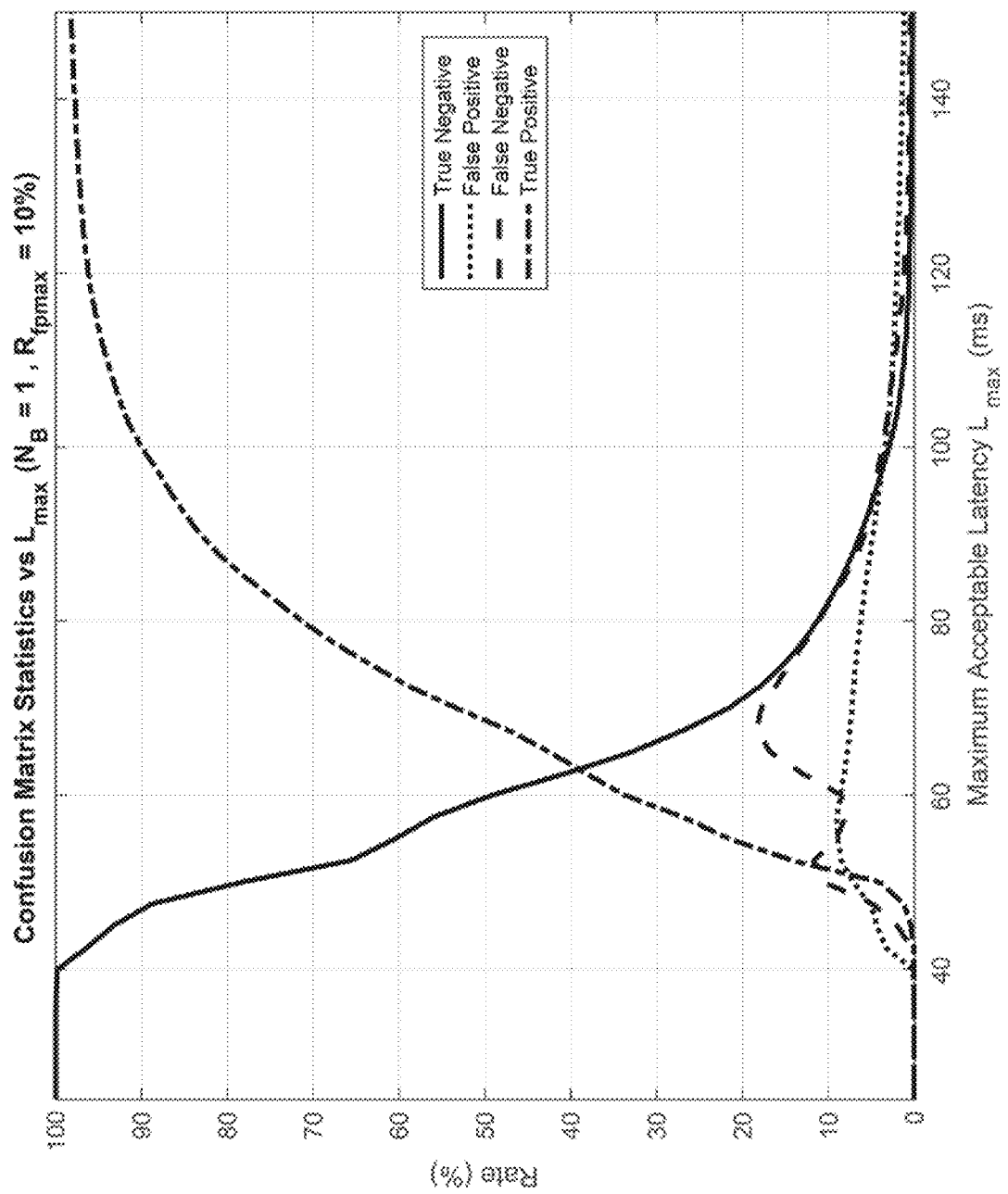
FIG. 19 is an example plot of confusion matrix statistics versus a maximum acceptable latency for a false positive maximum rate of 10% in accordance with an embodiment of the present disclosure.

FIG. 18 shows an example plot of confusion matrix statistics versus a maximum acceptable latency for a false positive maximum rate of 1%. FIG. 19 shows an example plot of confusion matrix statistics versus a maximum acceptable latency for a false positive maximum rate of 10%. FIGS. 18-19 show examples of how the confusion matrix statistics change when the maximum latency requirement $L_{max}$ is adjusted. As the maximum latency requirement $L_{max}$ increases, (i) the true negative rate decreases, (ii) the false positive rate may increase to a maximum and then decrease, (iii) the false negative rate increases to a maximum near a crossing of the true negative curve and the true positive curve and then decreases, and (iv) the true positive rate increases. From these plots it is shown that the most challenging decision region is when the maximum latency requirement $L_{max}$ is near the average latency (e.g., at 62 ms) of the corresponding network. The further away the maximum latency requirement $L_{max}$ is from the average latency, the lower the false positive and false negative rates. By increasing $R_{fpmax}$ the false negative rate may be decreased.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" refers to or includes: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A vehicle application enabling system comprising:
   a memory configured to store a maximum network latency for a vehicle application;
   an initialization module configured to
      receive the maximum network latency from the memory,
      set a percentage of occurrences that the maximum network latency is not satisfied, a maximum false positive rate, and a maximum deviation value, and
      calculate a weighting factor based on the percentage of occurrences that the maximum network latency is not satisfied, the maximum false positive rate and the maximum deviation value,
   a latency evaluation module configured to implement a latency evaluation algorithm including
      comparing one or more latency estimates to the maximum network latency to provide one or more samples,
      updating confusion matrix statistics based on the one or more samples,
      updating a probability threshold based on the maximum false positive rate,
      updating weighted observations based on the weighting factor, and
      determining a predicted decision based on the probability threshold; and
   an application enable module configured to execute the vehicle application based on the probability threshold.

2. The vehicle application enabling system of claim 1, wherein:
initialization module is configured to obtain prior information;
the prior information includes a number of successes and a number of failures for satisfying the maximum network latency for current vehicle operating conditions;
the latency evaluation module is configured to estimate confidence interval parameters based on the prior information; and
the application enable module is configured to execute the vehicle application based on the confidence interval parameters.

3. The vehicle application enabling system of claim 1, wherein the initialization module is configured to:
calculate a distribution value based on the percentage of occurrences that the maximum network latency is not satisfied using a cumulative distribution function;
calculate a number of latency samples based on the distribution value; and
calculate the weighting factor based on the number of latency samples.

4. The vehicle application enabling system of claim 1, wherein the initialization module is configured to (i) set a binomial proportion value equal to the maximum false positive rate, and (ii) calculate the weighting factor based on the binomial proportion value.

5. The vehicle application enabling system of claim 1, wherein the one or more latency estimates are associated with transmission of signals in a network for the vehicle application.

6. The vehicle application enabling system of claim 1, wherein the latency evaluation module is configured to:
buffer a predetermined number of samples based on the comparing of the one or more samples to the maximum network latency;
set an actual decision to True based on whether each of the predetermined number of samples is True; and
determine the confusion matrix statistics based on the actual decision.

7. The vehicle application enabling system of claim 1, wherein the maximum deviation value is less than or equal to the maximum false positive rate divided by a predetermined value.

8. The vehicle application enabling system of claim 1, wherein the latency evaluation module is configured to permit the maximum false positive rate to increase to decrease a true negative rate, decrease a false negative rate and increase a true positive rate.

9. The vehicle application enabling system of claim 1, wherein the latency evaluation module is configured to increase the number of the samples buffered to increase a true negative rate, reduce a false negative rate and reduce a true positive rate.

10. The vehicle application enabling system of claim 1, wherein the latency evaluation module is configured to increase the maximum network latency to decrease a true negative rate and increase a true positive rate.

11. A method of operating a vehicle application enabling system, the method comprising:
storing in a memory a maximum network latency for a vehicle application, wherein the vehicle application is a lane change application, a collision avoidance application, a ramp routing application, or a platooning application;
receiving the maximum network latency from the memory;
setting a percentage of occurrences that the maximum network latency is not satisfied, a maximum false positive rate, and a maximum deviation value;
calculating a weighting factor based on the percentage of occurrences that the maximum network latency is not satisfied, the maximum false positive rate and the maximum deviation value;
implementing, via a latency evaluation module, a latency evaluation algorithm including
comparing one or more latency estimates to the maximum network latency to provide one or more samples,
determining whether the one or more latency estimates are less than the maximum network latency,
updating confusion matrix statistics based on the one or more samples,
updating a probability threshold based on the maximum false positive rate,
updating weighted observations based on the weighting factor, and
determining a predicted decision based on the probability threshold; and
executing the vehicle application based on the probability threshold and in response to the one or more latency estimates being less than the maximum network latency.

12. The method of claim 11, further comprising:
obtaining prior information, wherein the prior information includes a number of successes and a number of failures for satisfying the maximum network latency for current vehicle operating conditions;
estimating confidence interval parameters based on the prior information; and
executing the vehicle application based on the confidence interval parameters.

13. The method of claim 11, further comprising:
calculating a distribution value based on the percentage of occurrences that the maximum network latency is not satisfied using a cumulative distribution function;
calculating a number of latency samples based on the distribution value; and
calculating the weighting factor based on the number of latency samples.

14. The method of claim 11, further comprising:
setting a binomial proportion value equal to the maximum false positive rate; and
calculating the weighting factor based on the binomial proportion value.

15. The method of claim 11, wherein the one or more latency estimates are associated with transmission of signals in a network for the vehicle application.

16. The method of claim 11, further comprising:
buffering a predetermined number of samples based on the comparing of the one or more samples to the maximum network latency;
setting an actual decision to True based on whether each of the predetermined number of samples is True; and
determining the confusion matrix statistics based on the actual decision.

17. The method of claim 11, wherein the maximum deviation value is less than or equal to the maximum false positive rate divided by a predetermined value.

18. The method of claim 11, further comprising permitting the maximum false positive rate to increase to decrease a true negative rate, decrease a false negative rate and increase a true positive rate.

19. The method of claim 11, further comprising increasing the number of the samples buffered to increase a true negative rate, reduce a false negative rate and reduce a true positive rate.

20. The method of claim 11, further comprising increasing the maximum network latency to decrease a true negative rate and increase a true positive rate.

* * * * *

UNITED STATES PATENT AND TRADEMARK OFFICE
CERTIFICATE OF CORRECTION

PATENT NO. : 10,797,981 B2
APPLICATION NO. : 16/255507
DATED : October 6, 2020
INVENTOR(S) : Haris Volos et al.

Page 1 of 1

It is certified that error appears in the above-identified patent and that said Letters Patent is hereby corrected as shown below:

In the Claims

Column 23, Line 3: Claim 2, before "initialization", insert --the--

Signed and Sealed this
First Day of December, 2020

Andrei Iancu
*Director of the United States Patent and Trademark Office*